(12) United States Patent
Osakada et al.

(10) Patent No.: US 8,188,202 B2
(45) Date of Patent: May 29, 2012

(54) DIENE POLYMER AND PRODUCTION PROCESS THEREOF

(75) Inventors: Kohtaro Osakada, Yokohama (JP);
Daisuke Takeuchi, Yokohama (JP);
Yusuke Fukuda, Yokohama (JP);
Osamu Ihata, Chiba (JP); Hiroshi Kuribayashi, Ichihara (JP)

(73) Assignees: Sumitomo Chemical Company, Limited, Tokyo (JP); Tokyo Institute of Technology, Tokyo (JP)

(*) Notice: Subject to any disclaimer, the term of this patent is extended or adjusted under 35 U.S.C. 154(b) by 203 days.

(21) Appl. No.: 12/787,553

(22) Filed: May 26, 2010

(65) Prior Publication Data

US 2010/0234546 A1  Sep. 16, 2010

Related U.S. Application Data

(62) Division of application No. 12/372,815, filed on Feb. 18, 2009, now Pat. No. 7,799,886.

(30) Foreign Application Priority Data

Feb. 29, 2008 (JP) .................................. 2008-051064

(51) Int. Cl.
*C08F 4/80* (2006.01)
*C08F 4/70* (2006.01)
*C08F 36/20* (2006.01)

(52) U.S. Cl. ...................... 526/169.1; 526/169; 526/161; 526/172; 526/134; 526/336; 526/340.3; 526/280; 526/308

(58) Field of Classification Search ................ 526/169.1, 526/169, 336
See application file for complete search history.

(56) References Cited

U.S. PATENT DOCUMENTS

| | | | |
|---|---|---|---|
| 5,571,850 A | 11/1996 | Ma et al. | |
| 5,631,345 A | 5/1997 | Takaya et al. | |
| 6,175,047 B1 | 1/2001 | Hori et al. | |
| 6,995,226 B2 | 2/2006 | Taguchi et al. | |
| 7,799,886 B2 | 9/2010 | Osakada et al. | |
| 2004/0024137 A1 | 2/2004 | Kusudou et al. | |
| 2004/0152843 A1 | 8/2004 | Taguchi et al. | |
| 2008/0214754 A1 | 9/2008 | Osakada et al. | |
| 2008/0214755 A1* | 9/2008 | Osakada et al. ............... | 526/131 |
| 2008/0214756 A1 | 9/2008 | Osakada et al. | |
| 2008/0221286 A1 | 9/2008 | Osakada et al. | |
| 2008/0221287 A1 | 9/2008 | Osakada et al. | |
| 2008/0221288 A1 | 9/2008 | Osakada et al. | |
| 2008/0234450 A1* | 9/2008 | Osakada et al. ............... | 526/131 |
| 2009/0171054 A1 | 7/2009 | Osakada et al. | |

FOREIGN PATENT DOCUMENTS

| | | |
|---|---|---|
| JP | 2001-29794 A | 2/2001 |
| JP | 2006-193708 A | 7/2006 |
| WO | 96/23010 A1 | 8/1996 |
| WO | 99/05189 A1 | 2/1999 |
| WO | 2007/023618 A1 | 3/2007 |

OTHER PUBLICATIONS

Takeuchi et al., J. Am. Chem. Soc. 2007, 129, 7002-7003.*
Okada et al., Angew. Chem. Int. Ed. 2007, 46, 6141-6143.*
U.S. Office Action issued Sep. 16, 2010 in U.S. Appl. No. 11/946,939.
Gomez, et al.: "Aryloxide ligand modification: new classical catalytic systems for olefin metathesis"; Journal of Molecular Catalysis A: Chemical; 160; pp. 145-156 (2000).
U.S. Office Action issued Sep. 16, 2010 in U.S. Appl. No. 12/036,230.
U.S. Office Action issued Sep. 16, 2010 in U.S. Appl. No. 11/957,859.
U.S. Office Action issued Sep. 16, 2010 in U.S. Appl. No. 11/958,438.
U.S. Office Action issued Sep. 17, 2010 in U.S. Appl. No. 11/958,905.
U.S. Office Action issued Sep. 16, 2010 in U.S. Appl. No. 12/036,231.
U.S. Office Action issued Dec. 1, 2010 in U.S. Application No. 12/064,399.
STN Search Results dated Nov. 17, 2010 attached to Office Action issued Dec. 1, 2010 in U.S. Appl. No. 12/064,399.
U.S. Office Action dated Sep. 16, 2010 in U.S. Appl. No. 12/036,233.
Takeshi Okada et al.; "Pd-Catalyzed Polymerization of Dienes that Involves Chain-Walking Isomerization of the Growing Polymer End: Synthesis of Polymers Composed of Polymethylene and Five-Membered-Ring Units"; Angew. Chem Int.Ed.; vol. 46; pp. 6141-6143 (2007).

(Continued)

*Primary Examiner* — David Wu
(74) *Attorney, Agent, or Firm* — Panitch Schwarze Belisario & Nadel LLP

(57) ABSTRACT

A polymer comprising a unit represented by the following formula (1); and a process for producing the polymer comprising the step of polymerizing a diene compound such as 9,9-diallylfluorene in the presence of a polymerization catalyst formed by contacting a nickel compound with an organoaluminum compound and/or a boron compound:

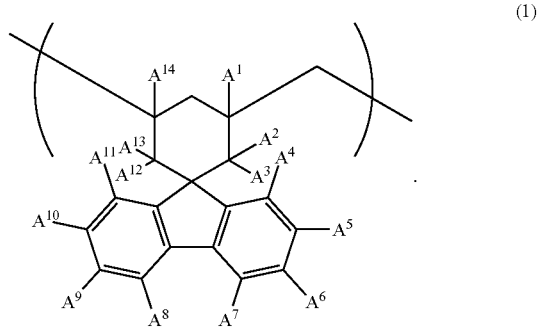

(1)

5 Claims, No Drawings

OTHER PUBLICATIONS

Geoffrey W. Coates et al.; "Chiral polymers via cyclopolymerization"; Journal of Molecular Catalysis; vol. 76; pp. 189-194 (1992).

Daisuke Takeuchi et al., "Cyclopolymerization of 1,6-Heptadienes Catalyzed by Iron and Cobalt Complexes: Synthesis of Polymers With Trans-or Cis-Fused 1,2-Cyclopentanediyl Groups Depending on the Catalyst", JACS Communications, vol. 129, No. 22, pp. 7002-7003, (2007).

Masayuki Fujita et al. "Synthesis and Characterization of Alternating and Multiblock Copolymers for Ethylene and Cyclopentene", Macromolecules, vol. 35, pp. 9640-9647, (2002).

Laurel A. Goj et al., "Mechanistic Studies of the Cycloisomerization of Dimethyl Diallylmalonate Catalyzed by a Cationic Palladium Phenanthroline Complex", J. Am. Chem. Soc., vol. 123, pp. 11133-11147, (2001).

Nicholas S. Perch et al., "Mechanism of Palladium-Catalyzed Diene Cyclization/Hydrosilylation: Direct Observation of Intramolecular Carbometalation", J. Am. Chem., vol. 126, pp. 6332-6346, (2004).

Sehoon Park et al., "Cyclization Polymerization of Diallylmalonates and Copolymerization with Ethylene Catalyzed by Palladium Complexes", Polymer Preprints, Japan, vol. 54, No. 2, pp. 2570 w/attachment, (2005).

Sehoon Park et al., "Pd Complex-Promoted Cyclopolymerization of Functionalized $\alpha,\omega$-Dienes and Copolymerization with Ethylene to Afford Polymers with Cyclic Repeating Units", J. Am. Chem. Soc., vol. 128, pp. 3510-3511, (2006).

U.S. Appl. No. 11/959,940, filed Dec. 19, 2007.

\* cited by examiner

DIENE POLYMER AND PRODUCTION PROCESS THEREOF

CROSS-REFERENCE TO RELATED APPLICATIONS

This application is a divisional of U.S. patent application Ser. No. 12/372,815, filed Feb. 18, 2009, now U.S Pat. No. 7,799,886, the disclosure of which is incorporated herein by reference.

BACKGROUND OF THE INVENTION

The present invention relates to a diene polymer, and a process for producing a diene polymer.

It is known that a polymer is provided with a physical property such as an optical property and a heat resistance property by introducing a cyclic structure into a main chain of the polymer. For example, Journal of Molecular Catalysis, 76 (1992), 189-194 discloses poly(methylene-1,3-cyclopentane) having a cyclic structure in its main chain, which is prepared by cyclopolymerization of a nonconjugated diene such as 1,5-hexadiene.

It is also known that a polymer is improved in its physical property such as a heat resistance property by introducing an aromatic structure into the polymer. For example, JP 2006-193708A discloses a fluorene skeleton-containing (meth)acrylic polymer, and a production process thereof. Further, Angew. Chem. Int. Ed. 2007, 46, 6141-6143 and J. Am. Chem. Soc. 2007, 129, 7002-7003 disclose a polymer obtained by cyclopolymerization of a fluorene skeleton-containing monomer.

BRIEF SUMMARY OF THE INVENTION

However, a polymer such as the above poly(methylene-1, 3-cyclopentane) is unsatisfactory in its physical property such as a heat resistance property. The above fluorene skeleton-containing (meth)acrylic polymer is also unsatisfactory in its physical property such as a heat resistance property, and its production process has the following problems: (i) a (meth)acrylic polymer must be subjected to multiple polymer reactions in order to introduce a fluorene skeleton into the (meth)acrylic polymer, and (ii) a fluorene skeleton-containing (meth)acrylic polymer is not always homogeneous in its chemical structure due to those polymer reactions. The above polymer obtained by cyclopolymerization of a fluorene skeleton-containing monomer is unsatisfactory in its physical property such as a heat resistance property.

In view of the above circumstances, the present invention has an object to provide a new diene polymer having a superior heat resistance property, and a process for producing a diene polymer.

The present invention is a polymer comprising a unit represented by the following formula (1):

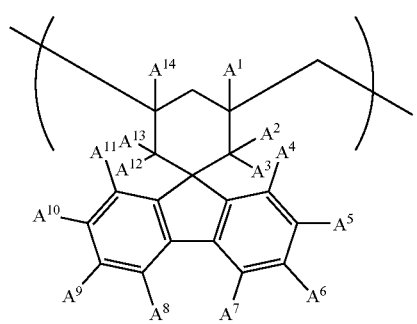

(1)

wherein $A^1$ to $A^{14}$ are independently of one another a hydrogen atom, a halogen atom or a hydrocarbyl group having 1 to 6 carbon atoms.

Also, the present invention is a process for producing a polymer containing the above unit represented by the formula (1), comprising the step of polymerizing a diene compound represented by the following formula (3) in the presence of a polymerization catalyst formed by contacting a nickel compound with an organoaluminum compound and/or a boron compound:

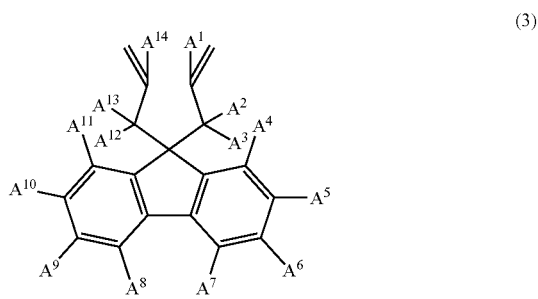

(3)

wherein all the symbols are the same as those defined in the formula (1).

In the present invention, the above term "unit" means a unit of a polymerized monomer such as the compound represented by the above formula (3).

DETAILED DESCRIPTION OF THE INVENTION

The hydrocarbyl group having 1 to 6 carbon atoms of $A^1$ to $A^{14}$ in the formula (1) is not limited, so long as the hydrocarbyl group has 1 to 6 carbon atoms. Examples of the hydrocarbyl group having 1 to 6 carbon atoms are linear hydrocarbyl groups, branched hydrocarbyl groups and cyclic hydrocarbyl groups. Examples of the linear hydrocarbyl group are a methyl group, an ethyl group, a n-propyl group, and a n-butyl group. Examples of the branched hydrocarbyl group are an isopropyl group, a sec-butyl group, a tert-butyl group, and an isobutyl group. Examples of the cyclic hydrocarbyl group are a phenyl group and a cyclohexyl group.

The polymer of the present invention comprises preferably the following unit represented by the formula (2):

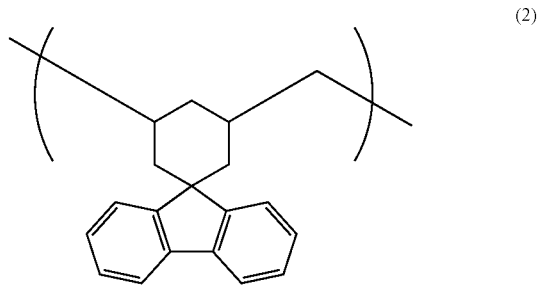

(2)

which is a formula in the time that $A^1$ to $A^{14}$ in the formula (1) are all a hydrogen atom.

The polymer of the present invention may comprise 50% by mol or more (however, less than 100% by mole) of the unit represented by the formula (2) and 50% by mol or less (however, more than 0% by mole) of the unit represented by the formula (1) except the case that $A^1$ to $A^{14}$ in the formula (1) are all a hydrogen atom, provided that the total of both units is 100% by mol.

An amount of units contained in the polymer of the present invention, such as the unit represented by the formula (1), can be measured according to a method known in the art such as an NMR method.

A molecular weight of the polymer of the present invention is not particularly limited. The polymer of the present invention has a weight-average molecular weight (Mw) of preferably 1,000 to 10,000,000, more preferably 2,000 to 5,000,000, and most preferably 4,000 to 3,000,000.

A molecular weight distribution (Mw/Mn) of the polymer of the present invention, which is defined as a ratio of a weight-average molecular weight (Mw) to a number-average molecular weight (Mn), is not particularly limited. The polymer of the present invention has a molecular weight distribution (Mw/Mn) of preferably 1 to 100, more preferably 1 to 50, and most preferably 1 to 20.

The polymer of the present invention has a glass-transition point of preferably 200° C. or higher, more preferably 250° C. or higher, and most preferably 300° C. or higher, the glass-transition point being a criterion for a heat resistance.

The diene compound as a monomer represented by the formula (3) may be a compound known in the art. The diene compound is preferably a compound having methyl groups for $A^4$ and $A^{11}$ and hydrogen atoms for all of $A^1$ to $A^{14}$ except $A^4$ and $A^{11}$; a compound having methyl groups for $A^4$, $A^5$, $A^{10}$ and $A^{11}$ and hydrogen atoms for all of $A^1$ to $A^{14}$ except $A^4$, $A^5$, $A^{10}$ and $A^{11}$; a compound having methyl groups for $A^4$, $A^5$, $A^6$, $A^9$, $A^{10}$ and $A^{11}$ and hydrogen atoms for all of $A^1$ to $A^{14}$ except $A^4$, $A^5$, $A^6$, $A^9$, $A^{10}$ and $A^{11}$; a compound having methyl groups for $A^4$ to $A^{11}$ and hydrogen atoms for all of $A^1$ to $A^{14}$ except $A^4$ to $A^{11}$; a compound having methyl groups for $A^5$ and $A^{10}$ and hydrogen atoms for all of $A^1$ to $A^{14}$ except $A^5$ and $A^{10}$; a compound having methyl groups for $A^5$, $A^6$, $A^9$ and $A^{10}$ and hydrogen atoms for all of $A^1$ to $A^{14}$ except $A^5$, $A^6$, $A^9$ and $A^{10}$; a compound having methyl groups for $A^5$ to $A^{10}$ and hydrogen atoms for all of $A^1$ to $A^{14}$ except $A^5$ to $A^{10}$; a compound having methyl groups for $A^6$ and $A^9$ and hydrogen atoms for all of $A^1$ to $A^{14}$ except $A^6$ and $A^9$; a compound having methyl groups for $A^7$ and $A^8$ and hydrogen atoms for all of $A^1$ to $A^{14}$ except $A^7$ and $A^8$; a compound having methyl groups for $A^6$ to $A^9$ and hydrogen atoms for all of $A^1$ to $A^{14}$ except $A^6$ to $A^9$; or 9,9-diallylfluorene; and more preferably 9,9-diallylfluorene. Those compounds may be used in combination of two or more thereof.

An example of the polymer of the present invention is a homopolymer of 9,9-diallylfluorene.

The nickel compound in the present invention is not particularly limited, as long as the nickel compound has an activity for addition polymerization. The nickel compound may be known in the art. Examples of the nickel compound are those represented by the following formula (9), and a μ-oxo type nickel compound, which is a dimer obtained by a reaction of the compound represented by the formula (9) with water:

$$L_a NiX^1_b \qquad (9)$$

wherein L is a cyclopentadiene-containing anionic group or a hetero atom-containing group, and two or more Ls may be linked to one another directly or through a multi-valent group containing a carbon atom, a silicone atom, a nitrogen atom, an oxygen atom, a sulfur atom or a phosphorus atom; $X^1$ is a halogen atom or a hydrocarbyl group having 1 to 20 carbon atoms; a is an integer satisfying $0 < a \leq 8$, and b is an integer satisfying $0 < b \leq 8$.

Examples of the cyclopentadiene-containing anionic group of L are a cyclopentadienyl group, a substituted cyclopentadienyl group, an indenyl group, a substituted indenyl group, a fluorenyl group, and a substituted fluorenyl group.

Specific examples of the cyclopentadiene-containing anionic group are an $\eta^5$-cyclopentadienyl group, an $\eta^5$-methylcyclopentadienyl group, an $\eta^5$-tert-butylcyclopentadienyl group, an $\eta^5$-1,2-dimethylcyclopentadienyl group, an $\eta^5$-1,3-dimethylcyclopentadienyl group, an $\eta^5$-1-tert-butyl-2-methylcyclopentadienyl group, an $\eta^5$-1-tert-butyl-3-methylcyclopentadienyl group, an $\eta^5$-1-methyl-2-isopropylcyclopentadienyl group, an $\eta^5$-1-methyl-3-isopropylcyclopentadienyl group, an $\eta^5$-1,2,3-trimethylcyclopentadienyl group, an $\eta^5$-1,2,4-trimethylcyclopentadienyl group, an $\eta^5$-tetramethylcyclopentadienyl group, an $\eta^5$-pentamethylcyclopentadienyl group, an $\eta^5$-indenyl group, an $\eta^5$-4,5,6,7-tetrahydroindenyl group, an $\eta^5$-2-methylindenyl group, an $\eta^5$-3-methylindenyl group, an $\eta^5$-4-methylindenyl group, an $\eta^5$-5-methylindenyl group, an $\eta^5$-6-methylindenyl group, an $\eta^5$-7-methylindenyl group, an $\eta^5$-2-tert-butylindenyl group, an $\eta^5$-3-tert-butylindenyl group, an $\eta^5$-4-tert-butylindenyl group, an $\eta^5$-5-tert-butylindenyl group, an $\eta^5$-6-tert-butylindenyl group, an $\eta^5$-7-tert-butylindenyl group, an $\eta^5$-2,3-dimethylindenyl group, an $\eta^5$-4,7-dimethylindenyl group, an $\eta^5$-2,4,7-trimethylindenyl group, an $\eta^5$-2-methyl-4-isopropylindenyl group, an $\eta^5$-4,5-benzindenyl group, an $\eta^5$-2-methyl-4,5-benzindenyl group, an $\eta^5$-4-phenylindenyl group, an $\eta^5$-2-methyl-5-phenylindenyl group, an $\eta^5$-2-methyl-4-phenylindenyl group, an $\eta^5$-2-methyl-4-naphthylindenyl group, an $\eta^5$-fluorenyl group, an $\eta^5$-2,7-dimethylfluorenyl group, and an $\eta^5$-2,7-di-tert-butylfluorenyl group.

Examples of the hetero atom in the hetero atom-containing group of L are an oxygen atom, a sulfur atom, a nitrogen atom, and a phosphorus atom. Examples of the hetero atom-containing group are an alkoxy group, an aryloxy group, an alkylthio group, an arylthio group, an alkylamino group, an arylamino group, an alkylphosphino group, an arylphosphino group, an aromatic or aliphatic heterocyclic group containing an oxygen atom, a sulfur atom, a nitrogen atom or a phosphorus atom in its ring, and a chelating ligand.

Specific examples of the hetero atom-containing group are alkoxy groups such as a methoxy group, an ethoxy group, a propoxy group, and a butoxy group; aryloxy groups such as a phenoxy group, a 2-methylphenoxy group, a 2,6-dimethylphenoxy group, a 2,4,6-trimethylphenoxy group, a 2-ethylphenoxy group, a 4-n-propylphenoxy group, a 2-isopropylphenoxy group, 2,6-diisopropylphenoxy group, a 4-sec-butylphenoxy group, a 4-tert-butylphenoxy group, a 2,6-di-sec-butylphenoxy group, a 2-tert-butyl-4-methylphenoxy group, and 2,6-di-tert-butylphenoxy group; substituted aryloxy groups such as a 4-methoxyphenoxy group, a 2,6-dimethoxyphenoxy group, a 3,5-dimethoxyphenoxy group, a 2-chlorophenoxy group, a 4-nitrosophenoxy group, a 4-nitrophenoxy group, a 2-aminophenoxy group, a 3-aminophenoxy group, a 4-aminophenoxy group, a 2,3,6-trichlorophenoxy group, and a 2,4,6-trifluorophenoxy group; hydrocarbylthio groups such as a methylthio group; alkylamino groups such as a dimethylamino group, a diethylamino group, a dipropylamino group, an isopropylamino group, and a tert-butylamino group; arylamino groups such as a diphenylamino group; a pyrrolyl group; phosphino groups such as a dimethylphosphino group; and aryldioxy groups such as a 2-(2-oxy-1-propyl)phenoxy group, a benzene-1,2-dioxy group, a benzene-1,3-dioxy group, a 4-isopropylbenzene-1,2-dioxy group, a 3-methoxybenzene-1,2-dioxy group, a naphthylene-1,8-dioxy group, a naphthylene-1,2-dioxy group, a 2,2'-biphenyldioxy group, a 2,2'-binaphthyldioxy group, a 6,6'-dimethyl-2,2'-biphenyldioxy group, a 4,4',6,6'-tetra-tert-butyl-2,2'-methylenediphenoxy group, and a 4,4',6,6'-tetramethyl-2,2'-isobutylidenediphenoxy group.

The above "chelating ligand" means a ligand having multiple coordinate bonds. Examples of the chelating ligand are acetylacetonate, diimine, oxazoline, bisoxazoline, terpyridine, acylhydrazone, diethylenetriamine, triethylenetetramine, porphyrin, crown ether and cryptate.

L contained in the above formula (9) is defined to be a cyclopentadiene-containing anionic group, or a hetero atom-containing group, and therefore, when the compound represented by the above formula (9) contains plural Ls, (i) plural cyclopentadiene-containing anionic groups are linked to one another directly or through a multi-valent group containing a carbon atom, a silicone atom, a nitrogen atom, an oxygen atom, a sulfur atom or a phosphorus atom, (ii) one or more cyclopentadiene-containing anionic groups and one or more plural hetero atom-containing groups are linked to one another directly or through a multi-valent group containing a carbon atom, a silicone atom, a nitrogen atom, an oxygen atom, a sulfur atom or a phosphorus atom, or (iii) plural hetero atom-containing groups are linked to one another directly or through a multi-valent group containing a carbon atom, a silicone atom, a nitrogen atom, an oxygen atom, a sulfur atom or a phosphorus atom. Examples of the multi-valent group are alkylene groups such as an ethylene group and a propylene group; substituted alkylene groups such as a dimethylmethylene group and a diphenylmethylene group; a silylene group; substituted silylene groups such as a dimethylsilylene group, a diphenylsilylene group, and a tetramethyldisilylene group; and hetero atoms such as a nitrogen atom, an oxygen atom, a sulfur atom and a phosphorus atom.

Examples of the halogen atom of $X^1$ in the formula (9) are a fluorine atom, a chlorine atom, a bromine atom and an iodine atom. Examples of the hydrocarbyl group having 1 to 20 carbon atoms of $X^1$ therein are a methyl group, an ethyl group, a n-propyl group, an isopropyl group, a n-butyl group, a phenyl group, and a benzyl group.

The numbers of "a" and "b" in the formula (9) are suitably determined according to the valence of the nickel atom, the valence of L, and the valence of $X^1$ such that the nickel compound is neutral.

Examples of the nickel compound represented by the formula (9) are as follows: [hydrotris(3,5-dimethylpyrazolyl)borate]nickel chloride, [hydrotris(3,5-dimethylpyrazolyl)borate]nickel bromide, [hydrotris(3,5-dimethylpyrazolyl)borate]nickel iodide, [hydrotris(3,5-dimethylpyrazolyl)borate]nickel methyl, [hydrotris(3,5-dimethylpyrazolyl)borate]nickel ethyl, [hydrotris(3,5-dimethylpyrazolyl)borate]nickel allyl, [hydrotris(3,5-dimethylpyrazolyl)borate]nickel methallyl, [hydrotris(3,5-diethylpyrazolyl)borate]nickel chloride, [hydrotris(3,5-diethylpyrazolyl)borate]nickel bromide, [hydrotris(3,5-diethylpyrazolyl)borate]nickel iodide, [hydrotris(3,5-diethylpyrazolyl)borate]nickel methyl, [hydrotris(3,5-diethylpyrazolyl)borate]nickel ethyl, [hydrotris(3,5-diethylpyrazolyl)borate]nickel allyl, [hydrotris(3,5-diethylpyrazolyl)borate]nickel methallyl, [hydrotris(3,5-di-tert-butylpyrazolyl)borate]nickel chloride, [hydrotris(3,5-di-tert-butylpyrazolyl)borate]nickel bromide, [hydrotris(3,5-di-tert-butylpyrazolyl)borate]nickel iodide, [hydrotris(3,5-di-tert-butylpyrazolyl)borate]nickel methyl, [hydrotris(3,5-di-tert-butylpyrazolyl)borate]nickel ethyl, [hydrotris(3,5-di-tert-butylpyrazolyl)borate]nickel allyl, [hydrotris(3,5-di-tert-butylpyrazolyl)borate]nickel methallyl, chloro(methyl)[N,N'-(ethane-1,2-diylidene)bis(aniline-κN)]nickel, chloro(methyl)[N,N'-(ethane-1,2-diylidene)bis(2-methyl aniline-κN)]nickel, chloro(methyl)[N,N'-(ethane-1,2-diylidene)bis(2-ethyl aniline-κN)]nickel, chloro(methyl)[N,N'-(ethane-1,2-diylidene)bis(2-n-propyl aniline-κN)]nickel, chloro(methyl)[N,N'-(ethane-1,2-diylidene)bis(2-isopropyl aniline-κN)]nickel, chloro(methyl)[N,N'-(ethane-1,2-diylidene)bis(2-n-butyl aniline-κN)]nickel, chloro(methyl)[N,N'-(ethane-1,2-diylidene)bis(2-isobutyl aniline-κN)]nickel, chloro(methyl)[N,N'-(ethane-1,2-diylidene)bis(2-n-hexyl aniline-κN)]nickel, chloro(methyl)[N,N'-(ethane-1,2-diylidene)bis(4-methyl aniline-κN)]nickel, chloro(methyl)[N,N'-(ethane-1,2-diylidene)bis(2,6-dimethyl aniline-κN)]nickel, chloro(methyl)[N,N'-(ethane-1,2-diylidene)bis(2,6-diethyl aniline-κN)]nickel, chloro(methyl)[N,N'-(ethane-1,2-diylidene)bis(2,6-di-n-propylaniline-κN)]nickel, chloro(methyl)[N,N'-(ethane-1,2-diylidene)bis(2,6-diisopropylaniline-κN)]nickel, chloro(methyl)[N,N'-(ethane-1,2-diylidene)bis(2,6-di-n-butylaniline-κN)]nickel, chloro(methyl)[N,N'-(ethane-1,2-diylidene)bis(2,6-diisobutylaniline-κN)]nickel, chloro(methyl)[N,N'-(ethane-1,2-diylidene)bis(2,6-di-n-hexylaniline-κN)]nickel, chloro(methyl)[N,N'-(ethane-1,2-diylidene)bis(2-methyl-6-ethylaniline-κN)]nickel, chloro(methyl)[N,N'-(ethane-1,2-diylidene)bis(2-methyl-6-n-propylaniline-κN)]nickel, chloro(methyl)[N,N'-(ethane-1,2-diylidene)bis(2-methyl-6-isopropylaniline-κN)]nickel, chloro(methyl)[N,N'-(ethane-1,2-diylidene)bis(2-methyl-6-n-butylaniline-κN)]nickel, chloro(methyl)[N,N'-(ethane-1,2-diylidene)bis(2-ethyl-6-n-propylaniline-κN)]nickel, chloro(methyl)[N,N'-(ethane-1,2-diylidene)bis(2-ethyl-6-isopropylaniline-κN)]nickel, chloro(methyl)[N,N'-(ethane-1,2-diylidene)bis(2-ethyl-6-n-butylaniline-κN)]nickel, chloro(methyl)[N,N'-(ethane-1,2-diylidene)bis(2-n-propyl-6-isopropylaniline-κN)]nickel, chloro(methyl)[N,N'-(ethane-1,2-diylidene)bis(2-n-propyl-6-n-butylaniline-κN)]nickel, chloro(methyl)[N,N'-(ethane-1,2-diylidene)bis(2-isopropyl-6-n-butylaniline-κN)]nickel, chloro(methyl)[N,N'-(ethane-1,2-diylidene)bis{2,4-dimethyl-6-(2-methylphenyl)aniline-κN}]nickel, chloro(methyl)[N,N'-(ethane-1,2-diylidene)bis{2,4-dimethyl-6-(2-ethylphenyl)aniline-κN}]nickel, chloro(methyl)[N,N'-(ethane-1,2-diylidene)bis{2,4-dimethyl-6-(2-n-propylphenyl)aniline-κN}]nickel, chloro(methyl)[N,N'-(ethane-1,2-diylidene)bis{2,4-dimethyl-6-(2-isopropylphenyl)aniline-κN}]nickel, chloro(methyl)[N,N'-(ethane-1,2-diylidene)bis{2,4-dimethyl-6-(2,6-dimethylphenyl)aniline-κN}]nickel, chloro(methyl)[N,N'-(ethane-1,2-diylidene)bis{2,4-dimethyl-6-(2,6-diethylphenyl)aniline-κN}]nickel, chloro(methyl)[N,N'-(ethane-1,2-diylidene)bis{2,4-dimethyl-6-(2,6-di-n-propylphenyl)aniline-κN}]nickel, chloro(methyl)[N,N'-(ethane-1,2-diylidene)bis{2,4-dimethyl-6-(2,6-diisopropylphenyl)aniline-κN}]nickel, chloro(methyl)[N,N'-(ethane-1,2-diylidene)bis{2,4-dimethyl-6-(2-methyl-6-ethylphenyl)aniline-κN}]nickel, chloro(methyl)[N,N'-(ethane-1,2-diylidene)bis{2,4-dimethyl-6-(2-methyl-6-n-propylphenyl)aniline-κN}]nickel, chloro(methyl)[N,N'-(ethane-1,2-diylidene)bis{2,4-dimethyl-6-(2-methyl-6-isopropylphenyl)aniline-κN}]nickel, chloro(methyl)[N,N'-(ethane-1,2-diylidene)bis{2,4-dimethyl-6-(2-ethyl-6-n-propylphenyl)aniline-κN}]nickel, chloro(methyl)[N,N'-(ethane-1,2-diylidene)bis{2,4-dimethyl-6-(2-ethyl-6-isopropylphenyl)aniline-κN}]nickel, chloro(methyl)[N,N'-(ethane-1,2-diylidene)bis{2,4-dimethyl-6-(1-naphthyl)aniline-κN}]nickel, chloro(methyl)[N,N'-(butane-2,3-diylidene)bis(aniline-κN)]nickel, chloro(methyl)[N,N'-(butane-2,3-diylidene)bis(2-methyl aniline-κN)]nickel, chloro(methyl)[N,N'-(butane-2,3-diylidene)bis(2-ethyl aniline-κN)]nickel, chloro(methyl)[N,N'-(butane-2,3-diylidene)bis(2-n-propyl aniline-κN)]nickel, chloro(methyl)

[N,N'-(butane-2,3-diylidene)bis(2-isopropyl aniline-κN)]nickel, chloro(methyl)[N,N'-(butane-2,3-diylidene)bis(2-n-butyl aniline-κN)]nickel, chloro(methyl)[N,N'-(butane-2,3-diylidene)bis(2-isobutyl aniline-κN)]nickel, chloro(methyl)[N,N'-(butane-2,3-diylidene)bis(2-hexyl aniline-κN)]nickel, chloro(methyl)[N,N'-(butane-2,3-diylidene)bis(4-methyl aniline-κN)]nickel, chloro(methyl)[N,N'-(butane-2,3-diylidene)bis(2,6-dimethyl aniline-κN)]nickel, chloro(methyl)[N,N'-(butane-2,3-diylidene)bis(2,6-diethyl aniline-κN)]nickel, chloro(methyl)[N,N'-(butane-2,3-diylidene)bis(2,6-di-n-propylaniline-κN)]nickel, chloro(methyl)[N,N'-(butane-2,3-diylidene)bis(2,6-diiso propylaniline-κN)]nickel, chloro(methyl)[N,N'-(butane-2,3-diylidene)bis(2,6-di-n-butylaniline-κN)]nickel, chloro(methyl)[N,N'-(butane-2,3-diylidene)bis(2,6-diiso butylaniline-κN)]nickel, chloro(methyl)[N,N'-(butane-2,3-diylidene)bis(2,6-di-n-hexylaniline-κN)]nickel, chloro(methyl)[N,N'-(butane-2,3-diylidene)bis(2-methyl-6-ethylaniline-κN)]nickel, chloro(methyl)[N,N'-(butane-2,3-diylidene)bis(2-methyl-6-n-propylaniline-κN)]nickel, chloro(methyl)[N,N'-(butane-2,3-diylidene)bis(2-methyl-6-isopropylaniline-κN)]nickel, chloro(methyl)[N,N'-(butane-2,3-diylidene)bis(2-methyl-6-n-butylaniline-κN)]nickel, chloro(methyl)[N,N'-(butane-2,3-diylidene)bis(2-ethyl-6-n-propylaniline-κN)]nickel, chloro(methyl)[N,N'-(butane-2,3-diylidene)bis(2-ethyl-6-iso propylaniline-κN)]nickel, chloro(methyl)[N,N'-(butane-2,3-diylidene)bis(2-ethyl-6-n-butylaniline-κN)]nickel, chloro(methyl)[N,N'-(butane-2,3-diylidene)bis(2-n-propyl-6-isopropylaniline-κN)]nickel, chloro(methyl)[N,N'-(butane-2,3-diylidene)bis(2-n-propyl-6-n-butylaniline-κN)]nickel, chloro(methyl)[N,N'-(butane-2,3-diylidene)bis(2-isopropyl-6-n-butylaniline-κN)]nickel, chloro(methyl)[N,N'-(butane-2,3-diylidene)bis(2,4,6-trimethylaniline-κN)]nickel, chloro(methyl)[N,N'-(butane-2,3-diylidene)bis{2,4-dimethyl-6-(2-methylphenyl)aniline-κN}]nickel, chloro(methyl)[N,N'-(butane-2,3-diylidene)bis{2,4-dimethyl-6-(2-ethylphenyl)aniline-κN}]nickel, chloro(methyl)[N,N'-(butane-2,3-diylidene)bis{2,4-dimethyl-6-(2-n-propylphenyl)aniline-κN}]nickel, chloro(methyl)[N,N'-(butane-2,3-diylidene)bis{2,4-dimethyl-6-(2-isopropylphenyl)aniline-κN}]nickel, chloro(methyl)[N,N'-(butane-2,3-diylidene)bis{2,4-dimethyl-6-(2,6-dimethylphenyl)aniline-κN}]nickel, chloro(methyl)[N,N'-(butane-2,3-diylidene)bis{2,4-dimethyl-6-(2,6-diethylphenyl)aniline-κN}]nickel, chloro(methyl)[N,N'-(butane-2,3-diylidene)bis{2,4-dimethyl-6-(2,6-di-n-propylphenyl)aniline-κN}]nickel, chloro(methyl)[N,N'-(butane-2,3-diylidene)bis{2,4-dimethyl-6-(2,6-diisopropylphenyl)aniline-κN}]nickel, chloro(methyl)[N,N'-(butane-2,3-diylidene)bis{2,4-dimethyl-6-(2-methyl-6-ethylphenyl)aniline-κN}]nickel, chloro(methyl)[N,N'-(butane-2,3-diylidene)bis{2,4-dimethyl-6-(2-methyl-6-n-propylphenyl)aniline-κN}]nickel, chloro(methyl)[N,N'-(butane-2,3-diylidene)bis{2,4-dimethyl-6-(2-methyl-6-isopropylphenyl)aniline-κN}]nickel, chloro(methyl)[N,N'-(butane-2,3-diylidene)bis{2,4-dimethyl-6-(2-ethyl-6-n-propylphenyl)aniline-κN}]nickel, chloro(methyl)[N,N'-(butane-2,3-diylidene)bis{2,4-dimethyl-6-(2-ethyl-6-isopropylphenyl)aniline-κN}]nickel, chloro(methyl)[N,N'-(butane-2,3-diylidene)bis{2,4-dimethyl-6-(1-naphthyl)aniline-κN}]nickel, chloro(methyl)[N,N'-(1,2-dihydroacenaphthylene-1,2-diylidene)bis(aniline-κN)]nickel, chloro(methyl)[N,N'-(1,2-dihydroacenaphthylene-1,2-diylidene)bis(2-methylaniline-κN)]nickel, chloro(methyl)[N,N'-(1,2-dihydroacenaphthylene-1,2-diylidene)bis(2-ethylaniline-κN)]nickel, chloro(methyl)[N,N'-(1,2-dihydroacenaphthylene-1,2-diylidene)bis(2-n-propylaniline-κN)]nickel, chloro(methyl)[N,N'-(1,2-dihydroacenaphthylene-1,2-diylidene)bis(2-isopropylaniline-κN)]nickel, chloro(methyl)[N,N'-(1,2-dihydroacenaphthylene-1,2-diylidene)bis(4-methylaniline-κN)]nickel, chloro(methyl)[N,N'-(1,2-dihydroacenaphthylene-1,2-diylidene)bis(2-n-butylaniline-κN)]nickel, chloro(methyl)[N,N'-(1,2-dihydroacenaphthylene-1,2-diylidene)bis(2-isobutylaniline-κN)]nickel, chloro(methyl)[N,N'-(1,2-dihydroacenaphthylene-1,2-diylidene)bis(2-n-hexylaniline-κN)]nickel, chloro(methyl)[N,N'-(1,2-dihydroacenaphthylene-1,2-diylidene)bis(2,6-dimethylaniline-κN)]nickel, chloro(methyl)[N,N'-(1,2-dihydroacenaphthylene-1,2-diylidene)bis(2,6-diethylaniline-κN)]nickel, chloro(methyl)[N,N'-(1,2-dihydroacenaphthylene-1,2-diylidene)bis(2,6-di-n-propylaniline-κN)]nickel, chloro(methyl)[N,N'-(1,2-dihydroacenaphthylene-1,2-diylidene)bis(2,6-diisopropylaniline-κN)]nickel, chloro(methyl)[N,N'-(1,2-dihydroacenaphthylene-1,2-diylidene)bis(2,6-di-n-butylaniline-κN)]nickel, chloro(methyl)[N,N'-(1,2-dihydroacenaphthylene-1,2-diylidene)bis(2,6-diisobutylaniline-κN)]nickel, chloro(methyl)[N,N'-(1,2-dihydroacenaphthylene-1,2-diylidene)bis(2,6-di-n-hexylaniline-κN)]nickel, chloro(methyl)[N,N'-(1,2-dihydroacenaphthylene-1,2-diylidene)bis(2-methyl-6-ethylaniline-κN)]nickel, chloro(methyl)[N,N'-(1,2-dihydroacenaphthylene-1,2-diylidene)bis(2-methyl-6-n-propylaniline-κN)]nickel, chloro(methyl)[N,N'-(1,2-dihydroacenaphthylene-1,2-diylidene)bis(2-methyl-6-isopropylaniline-κN)]nickel, chloro(methyl)[N,N'-(1,2-dihydroacenaphthylene-1,2-diylidene)bis(2-methyl-6-n-butylaniline-κN)]nickel, chloro(methyl)[N,N'-(1,2-dihydroacenaphthylene-1,2-diylidene)bis(2-ethyl-6-n-propylaniline-κN)]nickel, chloro(methyl)[N,N'-(1,2-dihydroacenaphthylene-1,2-diylidene)bis(2-ethyl-6-isopropylaniline-κN)]nickel, chloro(methyl)[N,N'-(1,2-dihydroacenaphthylene-1,2-diylidene)bis(2-ethyl-6-n-butylaniline-κN)]nickel, chloro(methyl)[N,N'-(1,2-dihydroacenaphthylene-1,2-diylidene)bis(2-n-propyl-6-isopropylaniline-κN)]nickel, chloro(methyl)[N,N'-(1,2-dihydroacenaphthylene-1,2-diylidene)bis(2-n-propyl-6-n-butylaniline-κN)]nickel, chloro(methyl)[N,N'-(1,2-dihydroacenaphthylene-1,2-diylidene)bis(2-isopropyl-6-n-butylaniline-κN)]nickel, chloro(methyl)[N,N'-(1,2-dihydroacenaphthylene-1,2-diylidene)bis(2,4,6-trimethylaniline-κN)]nickel, chloro(methyl)[N,N'-(1,2-dihydroacenaphthylene-1,2-diylidene)bis{2,4-dimethyl-6-(2-methylphenyl)aniline-κN}]nickel, chloro(methyl)[N,N'-(1,2-dihydroacenaphthylene-1,2-diylidene)bis{2,4-dimethyl-6-(2-ethylphenyl)aniline-κN}]nickel, chloro(methyl)[N,N'-(1,2-dihydroacenaphthylene-1,2-diylidene)bis{2,4-dimethyl-6-(2-n-propylphenyl)aniline-κN}]nickel, chloro(methyl)[N,N'-(1,2-dihydroacenaphthylene-1,2-diylidene)bis{2,4-dimethyl-6-(2-isopropylphenyl)aniline-κN}]nickel, chloro(methyl)[N,N'-(1,2-dihydroacenaphthylene-1,2-diylidene)bis{2,4-dimethyl-6-(2,6-dimethylphenyl)aniline-κN}]nickel, chloro(methyl)[N,N'-(1,2-dihydroacenaphthylene-1,2-diylidene)bis{2,4-dimethyl-6-(2,6-diethylphenyl)aniline-κN}]nickel, chloro(methyl)[N,N'-(1,2-dihydroacenaphthylene-1,2-diylidene)bis{2,4-dimethyl-6-(2,6-di-n-propylphenyl)aniline-κN}]nickel, chloro(methyl)[N,N'-(1,2-dihydroacenaphthylene-1,2-diylidene)bis{2,4-dimethyl-6-(2,6-diisopropylphenyl)aniline-κN}]nickel, chloro(methyl)[N,N'-(1,2-dihydroacenaphthylene-1,2-diylidene)bis{2,4-dimethyl-6-(2-methyl-6-ethylphenyl)aniline-κN}]nickel, chloro(methyl)[N,N'-(1,2-dihydroacenaphthylene-1,2-diylidene)bis{2,4- dimethyl-6-(2-methyl-6-n-propylphenyl)aniline-κN}]
nickel, chloro(methyl)[N,N'-(1,2-dihydroacenaphthylene-1,
2-diylidene)bis{2,4-dimethyl-6-(2-methyl-6-
isopropylphenyl)aniline-κN}]nickel, chloro(methyl)[N,N'-
(1,2-dihydroacenaphthylene-1,2-diylidene)bis{2,4-
dimethyl-6-(2-ethyl-6-n-propylphenyl)aniline-κN}]nickel,
chloro(methyl)[N,N'-(1,2-dihydroacenaphthylene-1,2-
diylidene)bis{2,4-dimethyl-6-(2-ethyl-6-isopropylphenyl)
aniline-κN}]nickel, chloro(methyl)[N,N'-(1,2-dihy-
droacenaphthylene-1,2-diylidene)bis{2,4-dimethyl-6-(1-
naphthyl)aniline-κN}]nickel, and dibromo[N,N'-(1,2-
dihydroacenaphthylene-1,2-diylidene)bis(2,6-
diisopropylaniline-κN)]nickel, and combinations of two or
more of the above compounds.

The nickel compound is preferably a compound represented by the following formula (4):

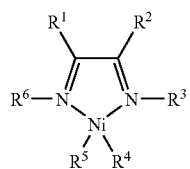

(4)

wherein $R^1$ and $R^2$ are independently of each other a hydrogen atom or a hydrocarbyl group having 1 to 20 carbon atoms, and $R^1$ and $R^2$ may be linked with each other to form a ring; $R^3$ and $R^6$ are independently of each other a hydrocarbyl group having 1 to 30 carbon atoms; and $R^4$ and $R^5$ are independently of each other a hydrogen atom, a halogen atom, an alkyl group, an aralkyl group, an aryl group, a silyl group, a siloxy group, an alkoxy group, an aralkyloxy group, or an aryloxy group, and may be linked with each other to form a ring.

Examples of the hydrocarbyl group having 1 to 20 carbon atoms of $R^1$ and $R^2$ are an alkyl group and an aryl group. Those groups may have a substituent such as a halogen atom, a hydrocarbyloxy group, a nitro group, a sulfonyl group, and a silyl group. Examples of the alkyl group are linear alkyl groups such as a methyl group, an ethyl group, and a n-butyl group; branched alkyl groups such as an isopropyl group, an isobutyl group, a tert-butyl group, and a neopentyl group; and cyclic alkyl groups such as a cyclohexyl group and a cyclooctyl group. Among them, preferred is an alkyl group having 1 to 20 carbon atoms, more preferred is a linear alkyl group having 1 to 12 carbon atoms, and further preferred is a methyl group or an ethyl group. Examples of the aryl group are a phenyl group, a naphthyl group, a 4-tolyl group, and a mesityl group. Among them, preferred is an aryl group having 6 to 20 carbon atoms, more preferred is an aryl group having 6 to 12 carbon atoms, and further preferred is a phenyl group or a mesityl group.

When $R^1$ and $R^2$ in the formula (4) are linked with each other to form a ring, examples of the ring are aliphatic rings and aromatic rings. Those rings may have a substituent. Examples of a divalent group making the above aliphatic rings are a 1,2-ethylene group, a cyclohexane-1,2-diyl group, a norbornane-1,2-diyl group, a butane-2,3-diyl group, a 2,3-dimethylbutane-2,3-diyl group, and a pentane-2,4-diyl group. Examples of a divalent group making the above aromatic rings are a 1,2-phenylene group and a naphthalene-1, 8-diyl group. Among them, preferred is a naphthalene-1,8-diyl group.

Examples of the hydrocarbyl group having 1 to 30 carbon atoms of $R^3$ and $R^6$ in the formula (4) are an alkyl group, an aralkyl group, and an aryl group. Those groups may have a substituent such as a halogen atom, a hydrocarbyloxy group, a nitro group, a sulfonyl group, and a silyl group. Examples of the alkyl group are linear alkyl groups Examples of the above alkyl group are linear alkyl groups such as a methyl group, an ethyl group, and a n-butyl group; branched alkyl groups such as an isopropyl group, an isobutyl group, a tert-butyl group, and a neopentyl group; and cyclic alkyl groups such as a cyclohexyl group and a cyclooctyl group. Among them, preferred is an alkyl group having 1 to 20 carbon atoms, more preferred is a branched alkyl group having 1 to 12 carbon atoms, and further preferred is an isopropyl group or a tert-butyl group.

Examples of the above aralkyl group are a benzyl group and a phenethyl group. Among them, preferred is an aralkyl group having 7 to 20 carbon atoms, more preferred is an aralkyl group having 7 to 12 carbon atoms, and further preferred is a benzyl group.

Examples of the above aryl group are a phenyl group, a 2-methylphenyl group, a 2-ethylphenyl group, a 2-n-propylphenyl group, a 2-isopropylphenyl group, a 2-n-butylphenyl group, a 2-isobutylphenyl group, a 2-n-hexylphenyl group, a 4-methylphenyl group, a 2,6-dimethylphenyl group, a 2,6-diethylphenyl group, a 2,6-di-n-propylphenyl group, a 2,6-diisopropylphenyl group, a 2,6-di-n-butylphenyl group, a 2,6-diisobutylphenyl group, a 2,6-di-n-hexylphenyl group, a 2-methyl-6-ethylphenyl group, a 2-methyl-6-n-propylphenyl group, a 2-methyl-6-isopropylphenyl group, a 2-methyl-6-butylphenyl group, a 2-ethyl-6-n-propylphenyl group, a 2-ethyl-6-isopropylphenyl group, a 2-ethyl-6-n-butylphenyl group, a 2-n-propyl-6-isopropylphenyl group, a 2-n-propyl-6-n-butylphenyl group, a 2-isopropyl-6-n-butylphenyl group, a 2,4,6-trimethylphenyl group, a 2,4-dimethyl-6-(2-methylphenyl)phenyl group, a 2,4-dimethyl-6-(2-ethylphenyl) phenyl group, a 2,4-dimethyl-6-(2-n-propylphenyl)phenyl group, a 2,4-dimethyl-6-(2-isopropylphenyl)phenyl group, a 2,4-dimethyl-6-(2,6-dimethylphenyl)phenyl group, a 2,4-dimethyl-6-(2,6-diethylphenyl)phenyl group, a 2,4-dimethyl-6-(2,6-di-n-propylphenyl)phenyl group, a 2,4-dimethyl-6-(2,6-diisopropylphenyl)phenyl group, a 2,4-dimethyl-6-(2-methyl-6-ethylphenyl)phenyl group, a 2,4-dimethyl-6-(2-methyl-6-n-propylphenyl)phenyl group, a 2,4-dimethyl-6-(2-methyl-6-isopropylphenyl)phenyl group, a 2,4-dimethyl-6-(2-ethyl-6-n-propylphenyl)phenyl group, a 2,4-dimethyl-6-(2-ethyl-6-isopropylphenyl)phenyl group, and a 2,4-dimethyl-6-(1-naphthyl)phenyl group. Among them, preferred is an aryl group having 6 to 30 carbon atoms, and more preferred is an aryl group having 7 to 30 carbon atoms.

Examples of the halogen atom of $R^4$ and $R^5$ in the formula (4) are a fluorine atom, a chlorine atom, a bromine atom and an iodine atom. Among them, preferred is a chlorine atom or a bromine atom.

Examples of the alkyl group of $R^4$ and $R^5$ in the formula (4) are linear alkyl groups such as a methyl group, an ethyl group, and a n-butyl group; branched alkyl groups such as an isopropyl group, an isobutyl group, a tert-butyl group, and a neopentyl group; and cyclic alkyl groups such as a cyclohexyl group and a cyclooctyl group. Among them, preferred is an alkyl group having 1 to 20 carbon atoms, more preferred is a linear and non-substituted alkyl group having 1 to 12 carbon atoms, and further preferred is a methyl group.

Examples of the aralkyl group of $R^4$ and $R^5$ in the formula (4) are a benzyl group and a phenethyl group. Among them, preferred is an aralkyl group having 7 to 12 carbon atoms, more preferred is a non-substituted aralkyl group having 7 to 12 carbon atoms, and further preferred is a benzyl group.

Examples of the aryl group of $R^4$ and $R^5$ in the formula (4) are a phenyl group, a naphthyl group, a 4-tolyl group, a mesityl group, and a 4-phenylphenyl group. Among them, preferred is an aryl group having 6 to 20 carbon atoms, more preferred is an aryl group having 6 to 12 carbon atoms, and further preferred is a phenyl group, a 4-tolyl group or a mesityl group.

Examples of the silyl group of $R^4$ and $R^5$ in the formula (4) are mono-substituted silyl groups such as a methylsilyl group, an ethylsilyl group, and a phenylsilyl group; di-substituted silyl groups such as a dimethylsilyl group, a diethylsilyl group, and a diphenylsilyl group; and tri-substituted silyl groups such as a trimethylsilyl group, a trimethoxysilyl group, a dimethylmethoxysilyl group, a methyldimethoxysilyl group, a triethylsilyl group, a triethoxysilyl group, a tri-n-propylsilyl group, a triisopropylsilyl group, a tri-n-butylsilyl group, a tri-sec-butylsilyl group, a tert-butyldimethylsilyl group, a triisobutylsilyl group, a tert-butyldiphenylsilyl group, a cyclohexyldimethylsilyl group, a tricyclohexylsilyl group, and a triphenylsilyl group. Among them, preferred is a tri-substituted silyl group, and further preferred is a trimethylsilyl group, a triethylsilyl group, a triphenylsilyl group, a tert-butyldimethylsilyl group, a tert-butyldiphenylsilyl group, a cyclohexyldimethylsilyl group, or a triisopropylsilyl group.

Examples of the siloxy group of $R^4$ and $R^5$ in the formula (4) are a trimethylsiloxy group, a trimethoxysiloxy group, a dimethylmethoxysiloxy group, a methyldimethoxysiloxy group, a triethylsiloxy group, a triethoxysiloxy group, a tri-n-propylsiloxy group, a triisopropylsiloxy group, a tri-n-butylsiloxy group, a tri-sec-butylsiloxy group, a tert-butyldimethylsiloxy group, a triisobutylsiloxy group, a tert-butyldiphenylsiloxy group, a cyclohexyldimethylsiloxy group, a tricyclohexylsiloxy group, and a triphenylsiloxy group. Among them, preferred is a tri-substituted siloxy group, and further preferred is a trimethylsiloxy group, a triethylsiloxy group, a triphenylsiloxy group, a tert-butyldimethylsiloxy group, a tert-butyldiphenylsiloxy group, a cyclohexyldimethylsiloxy group, or a triisopropylsiloxy group.

Examples of the alkoxy group of $R^4$ and $R^5$ in the formula (4) are a methoxy group, an ethoxy group, a n-propoxy group, an isopropoxy group, a n-butoxy group, a sec-butoxy group, a tert-butoxy group, a n-pentyloxy group, a neopentyloxy group, a n-hexyloxy group, a n-octyloxy group, a n-dodecyloxy group, a n-pentadecyloxy group, and a n-eicosyloxy group. Among them, preferred is an alkoxy group having 1 to 20 carbon atoms, and more preferred is a methoxy group, an ethoxy group, an isopropoxy group, or a tert-butoxy group.

Examples of the aralkyloxy group of $R^4$ and $R^5$ in the formula (4) are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthylmethoxy group, and an anthracenylmethoxy group. Among them, preferred is an aralkyloxy group having 7 to 20 carbon atoms, and more preferred is a benzyloxy group.

Examples of the aryloxy group of $R^4$ and $R^5$ in the formula (4) are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a naphthoxy group, and an anthracenoxy group. Among them, preferred is an aryloxy group having 6 to 20 carbon atoms.

$R^4$ and $R^5$ in the formula (4) are preferably a hydrogen atom, a halogen atom, an alkyl group, or an aryl group, further preferably a hydrogen atom, a halogen atom, or a linear and non-substituted alkyl group having 1 to 12 carbon atoms, and particularly preferably a chlorine atom or a methyl group.

The nickel compound is more preferably a compound represented by the following formula (5) or (6):

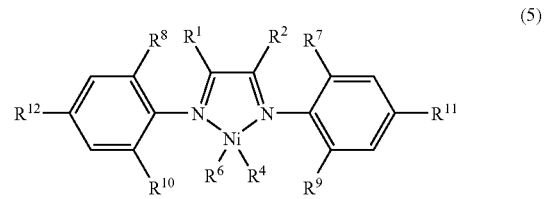

(5)

wherein $R^1$, $R^2$, $R^4$ and $R^5$ are the same as those in the formula (4); $R^7$ and $R^8$ are independently of each other a hydrogen atom, a halogen atom, an alkyl group, an aralkyl group, a silyl group, a siloxy group, an alkoxy group, an aralkyloxy group, an amino group, a substituted amino group, an amide group, an imido group, or a hydrocarbylthio group; $R^9$ and $R^{10}$ are independently of each other an aryl group having 7 to 20 carbon atoms; and $R^{11}$ and $R^{12}$ are independently of each other a hydrogen atom, a halogen atom, an alkyl group, an aralkyl group, an aryl group, a silyl group, a siloxy group, an alkoxy group, an aralkyloxy group, an aryloxy group, an amino group, a substituted amino group, an amide group, an imido group, or a hydrocarbylthio group;

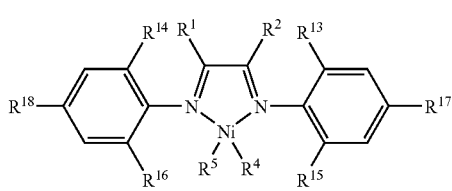

(6)

wherein $R^1$, $R^2$, $R^4$ and $R^5$ are the same as those in the formula (4); $R^{13}$, $R^{14}$, $R^{15}$ and $R^{16}$ are independently of one another a hydrogen atom, a halogen atom, an alkyl group, an aralkyl group, an aryl group having 6 to 30 carbon atoms, a silyl group, a siloxy group, an alkoxy group, an aralkyloxy group, an aryloxy group, an amino group, a substituted amino group, an amide group, an imido group, or a hydrocarbylthio group; and $R^{17}$ and $R^{18}$ are independently of each other a hydrogen atom, a halogen atom, an alkyl group, an aralkyl group, an aryl group, a silyl group, a siloxy group, an alkoxy group, an aralkyloxy group, an aryloxy group, an amino group, a substituted amino group, an amide group, an imido group, or a hydrocarbylthio group.

$R^7$ and $R^8$ in the formula (5) are preferably an alkyl group, further preferably an alkyl group having 1 to 12 carbon atoms, and particularly preferably a methyl group, an ethyl group, a n-propyl group, an isopropyl group, a n-butyl group, an isobutyl group, or a tert-butyl group.

Examples of the aryl group having 7 to 20 carbon atoms of $R^9$ and $R^{10}$ in the formula (5) are a 2-methylphenyl group, a 3-methylphenyl group, a 4-methylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group, a naphthyl group, a 2-methyl-1-naphthyl group, a 3-methyl-1-naphthyl group, a 4-methyl-1-naphthyl group, a 2,3-dimethyl-1-naphthyl group, a 2,4-dimethyl-1-naphthyl group, a 2,5-dimethyl-1-naphthyl group, a 2,6-dimethyl-1-naphthyl group, a 3,4-dimethyl-1-naphthyl group, a 3,5-dimethyl-1-naphthyl group, a 3,6-dimethyl-1-naphthyl group, an anthracenyl group, a 2-methyl-1-anthracenyl group, a 3-methyl-10-anthracenyl group, a 4-methyl-10-anthracenyl group, a 2,3-dimethyl-10-anthracenyl group, a 2,4-dimethyl-10-anthracenyl group, a 2,5-dimethyl-10-anthracenyl group, a 2,6-dimethyl-10-anthracenyl group, a 3,4-dimethyl-10-anthracenyl group, a 3,5-dimethyl-10-anthracenyl group, a 3,6-dimethyl-10-anthracenyl group, and a 2-methyl-10-anthracenyl group. Among them, preferred is a substituted phenyl group, a naphthyl group, or an anthracenyl group, and further preferred is a 2-methylphenyl group or a naphthyl group.

$R^{11}$ and $R^{12}$ in the formula (5) are preferably a hydrogen atom or an alkyl group, more preferably a hydrogen atom or an alkyl group having 1 to 12 carbon atoms, and further preferably a methyl group, an ethyl group, a n-propyl group, an isopropyl group, a n-butyl group, or an isobutyl group.

$R^{13}$ to $R^{18}$ in the formula (6) are preferably a hydrogen atom, an alkyl group, or an aryl group, more preferably a hydrogen atom, an alkyl group having 1 to 12 carbon atoms, or an aryl group having 6 to 20 carbon atoms, and further preferably a hydrogen atom, a methyl group, an ethyl group, a n-propyl group, an isopropyl group, a n-butyl group, an isobutyl group, a tert-butyl group, or a phenyl group.

Further, the nickel compound is preferably a compound represented by the following formula (7):

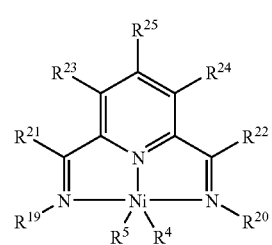

(7)

wherein $R^4$ and $R^5$ are independently of each other a hydrogen atom, a halogen atom, an alkyl group, an aralkyl group, an aryl group, a silyl group, a siloxy group, an alkoxy group, an aralkyloxy group, or an aryloxy group, and may be linked with each other to form a ring; and $R^{19}$ to $R^{25}$ are independently of one another a hydrogen atom, a halogen atom, an alkyl group, an aralkyl group, an aryl group, a silyl group, a siloxy group, an alkoxy group, an aralkyloxy group, an aryloxy group, an amino group, a substituted amino group, an amide group, an imido group, or a hydrocarbylthio group, and any two or more of $R^{19}$ to $R^{25}$ may be linked with one another to form a ring.

Examples of the halogen atom of $R^4$ and $R^5$ in the formula (7) are a fluorine atom, a chlorine atom, a bromine atom and an iodine atom. Among them, preferred is a chlorine atom or a bromine atom.

Examples of the alkyl group of $R^4$ and $R^5$ in the formula (7) are linear alkyl groups such as a methyl group, an ethyl group, and a n-butyl group; branched alkyl groups such as an isopropyl group, an isobutyl group, a tert-butyl group, and a neopentyl group; and cyclic alkyl groups such as a cyclohexyl group and a cyclooctyl group. Among them, preferred is an alkyl group having 1 to 20 carbon atoms, more preferred is a linear and non-substituted alkyl group having 1 to 12 carbon atoms, and further preferred is a methyl group.

Examples of the aralkyl group of $R^4$ and $R^5$ in the formula (7) are a benzyl group and a phenethyl group. Among them, preferred is an aralkyl group having 7 to 12 carbon atoms, more preferred is a non-substituted aralkyl group having 7 to 12 carbon atoms, and further preferred is a benzyl group.

Examples of the aryl group of $R^4$ and $R^5$ in the formula (7) are a phenyl group, a naphthyl group, a 4-tolyl group, a mesityl group, and a 4-phenylphenyl group. Among them, preferred is an aryl group having 6 to 20 carbon atoms, more preferred is an aryl group having 6 to 12 carbon atoms, and further preferred is a phenyl group, a 4-tolyl group or a mesityl group.

Examples of the silyl group of $R^4$ and $R^5$ in the formula (4) are mono-substituted silyl groups such as a methylsilyl group, an ethylsilyl group, and a phenylsilyl group; di-substituted silyl groups such as a dimethylsilyl group, a diethylsilyl group, and a diphenylsilyl group; and tri-substituted silyl groups such as a trimethylsilyl group, a trimethoxysilyl group, a dimethylmethoxysilyl group, a methyldimethoxysilyl group, a triethylsilyl group, a triethoxysilyl group, a tri-n-propylsilyl group, a triisopropylsilyl group, a tri-n-butylsilyl group, a tri-sec-butylsilyl group, a tert-butyldimethylsilyl group, a triisobutylsilyl group, a tert-butyldiphenylsilyl group, a cyclohexyldimethylsilyl group, a tricyclohexylsilyl group, and a triphenylsilyl group. Among them, preferred is a tri-substituted silyl group, and further preferred is a trimethylsilyl group, a triethylsilyl group, a triphenylsilyl group, a tert-butyldimethylsilyl group, a tert-butyldiphenylsilyl group, a cyclohexyldimethylsilyl group, or a triisopropylsilyl group.

Examples of the siloxy group of $R^4$ and $R^5$ in the formula (7) are a trimethylsiloxy group, a trimethoxysiloxy group, a dimethylmethoxysiloxy group, a methyldimethoxysiloxy group, a triethylsiloxy group, a triethoxysiloxy group, a tri-n-propylsiloxy group, a triisopropylsiloxy group, a tri-n-butylsiloxy group, a tri-sec-butylsiloxy group, a tert-butyldimethylsiloxy group, a triisobutylsiloxy group, a tert-butyldiphenylsiloxy group, a cyclohexyldimethylsiloxy group, a tricyclohexylsiloxy group, and a triphenylsiloxy group. Among them, preferred is a tri-substituted siloxy group, and further preferred is a trimethylsiloxy group, a triethylsiloxy group, a triphenylsiloxy group, a tert-butyldimethylsiloxy group, a tert-butyldiphenylsiloxy group, a cyclohexyldimethylsiloxy group, or a triisopropylsiloxy group.

Examples of the alkoxy group of $R^4$ and $R^5$ in the formula (7) are a methoxy group, an ethoxy group, a n-propoxy group, an isopropoxy group, a n-butoxy group, a sec-butoxy group, a tert-butoxy group, a n-pentyloxy group, a neopentyloxy group, a n-hexyloxy group, a n-octyloxy group, a n-dodecyloxy group, a n-pentadecyloxy group, and a n-eicosyloxy group. Among them, preferred is an alkoxy group having 1 to 20 carbon atoms, and more preferred is a methoxy group, an ethoxy group, an isopropoxy group, or a tert-butoxy group.

Examples of the aralkyloxy group of $R^4$ and $R^5$ in the formula (7) are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthylmethoxy group, and an anthracenylmethoxy group. Among them, preferred is an aralkyloxy group having 7 to 20 carbon atoms, and more preferred is a benzyloxy group.

Examples of the aryloxy group of $R^4$ and $R^5$ in the formula (7) are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a naphthoxy group, and an anthracenoxy group. Among them, preferred is an aryloxy group having 6 to 20 carbon atoms.

$R^4$ and $R^5$ in the formula (7) are preferably a hydrogen atom, a halogen atom, an alkyl group, or an aryl group, further preferably a hydrogen atom, a halogen atom, or a linear and non-substituted alkyl group having 1 to 12 carbon atoms, and particularly preferably a chlorine atom or a methyl group.

Examples of the halogen atom of $R^{19}$ to $R^{25}$ in the formula (7) are a fluorine atom, a chlorine atom, a bromine atom and an iodine atom. Among them, preferred is a chlorine atom or a bromine atom.

Examples of the alkyl group of $R^{19}$ to $R^{25}$ in the formula (7) are linear alkyl groups such as a methyl group, an ethyl group, and a n-butyl group; branched alkyl groups such as an isopropyl group, an isobutyl group, a tert-butyl group, and a neopentyl group; and cyclic alkyl groups such as a cyclohexyl group and a cyclooctyl group. Among them, preferred is an alkyl group having 1 to 20 carbon atoms, more preferred is a branched alkyl group having 1 to 12 carbon atoms, and further preferred is an isopropyl group or a tert-butyl group.

Examples of the aralkyl group of $R^{19}$ to $R^{25}$ in the formula (7) are a benzyl group and a phenethyl group. Among them, preferred is an aralkyl group having 7 to 20 carbon atoms, more preferred is an aralkyl group having 7 to 12 carbon atoms, and further preferred is a benzyl group.

Examples of the aryl group of $R^{19}$ to $R^{25}$ in the formula (7) are a phenyl group, a 2-methylphenyl group, a 2-ethylphenyl group, a 2-n-propylphenyl group, a 2-isopropylphenyl group, a 2-n-butylphenyl group, a 2-isobutylphenyl group, a 2-tert-butylphenyl group, a 2-n-hexylphenyl group, a 2-cyclohexylphenyl group, a 3-methylphenyl group, a 3-ethylphenyl group, a 3-n-propylphenyl group, a 3-isopropylphenyl group, a 3-n-butylphenyl group, a 3-isobutylphenyl group, a 3-tert-butylphenyl group, a 3-n-hexylphenyl group, a 3-cyclohexylphenyl group, a 4-methylphenyl group, a 4-ethylphenyl group, a 4-n-propylphenyl group, a 4-isopropylphenyl group, a 4-n-butylphenyl group, a 4-isobutylphenyl group, a 4-tert-butylphenyl group, a 4-n-hexylphenyl group, a 4-cyclohexylphenyl group, a 2,6-dimethylphenyl group, a 2,6-diethylphenyl group, a 2,6-di-n-propylphenyl group, a 2,6-diisopropylphenyl group, a 2,6-di-n-butylphenyl group, a 2,6-diisobutylphenyl group, a 2,6-di-tert-butylphenyl group, a 2,6-di-n-hexylphenyl group, a 2,6-dicyclohexylphenyl group, a 2-methyl-6-ethylphenyl group, a 2-methyl-6-n-propylphenyl group, a 2-methyl-6-isopropylphenyl group, a 2-methyl-6-n-butylphenyl group, a 2-methyl-6-isobutylphenyl group, a 2-methyl-6-tert-butylphenyl group, a 2-methyl-6-n-hexylphenyl group, a 2-methyl-6-cyclohexylphenyl group, a 2-ethyl-6-n-propylphenyl group, a 2-ethyl-6-isopropylphenyl group, a 2-ethyl-6-n-butylphenyl group, a 2-ethyl-6-isobutylphenyl group, a 2-ethyl-6-tert-butylphenyl group, a 2-ethyl-6-n-hexylphenyl group, a 2-ethyl-6-cyclohexylphenyl group, a 2-n-propyl-6-isopropylphenyl group, a 2-n-propyl-6-n-butylphenyl group, a 2-n-propyl-6-isobutylphenyl group, a 2-n-propyl-6-tert-butylphenyl group, a 2-n-propyl-6-n-hexylphenyl group, a 2-n-propyl-6-cyclohexylphenyl group, a 2-isopropyl-6-n-butylphenyl group, a 2-isopropyl-6-isobutylphenyl group, a 2-isopropyl-6-tert-butylphenyl group, a 2-isopropyl-6-n-hexylphenyl group, a 2-isopropyl-6-cyclohexylphenyl group, a 2-n-butyl-6-isobutylphenyl group, a 2-n-butyl-6-tert-butylphenyl group, a 2-n-butyl-6-n-hexylphenyl group, a 2-n-butyl-6-cyclohexylphenyl group, a 2-isobutyl-6-tert-butylphenyl group, a 2-isobutyl-6-n-hexylphenyl group, a 2-isobutyl-6-cyclohexylphenyl group, a 2-tert-butyl-6-n-hexylphenyl group, a 2-tert-butyl-6-cyclohexylphenyl group, a 2-isobutyl-6-n-hexylphenyl group, a 2-n-hexyl-6-cyclohexylphenyl group, a 2,4-dimethylphenyl group, a 2,4-diethylphenyl group, a 2,4-di-n-propylphenyl group, a 2,4-diisopropylphenyl group, a 2,4-di-n-butylphenyl group, a 2,4-diisobutylphenyl group, a 2,4-di-tert-butylphenyl group, a 2,4-di-n-hexylphenyl group, a 2,4-di-cyclohexylphenyl group, a 2-ethyl-4-methylphenyl group, a 2-n-propyl-4-methylphenyl group, a 2-isopropyl-4-methylphenyl group, a 2-n-butyl-4-methylphenyl group, a 2-isobutyl-4-methylphenyl group, a 2-tert-butyl-4-methylphenyl group, a 2-n-hexyl-4-methylphenyl group, a 2-cyclohexyl-4-methylphenyl group, a 2-n-propyl-4-ethylphenyl group, a 2-isopropyl-4-ethylphenyl group, a 2-n-butyl-4-ethylphenyl group, a 2-isobutyl-4-ethylphenyl group, a 2-tert-butyl-4-ethylphenyl group, a 2-n-hexyl-4-ethylphenyl group, a 2-cyclohexyl-4-ethylphenyl group, a 2-isopropyl-4-n-propylphenyl group, a 2-n-butyl-4-n-propylphenyl group, a 2-isobutyl-4-n-propylphenyl group, a 2-tert-butyl-4-n-propylphenyl group, a 2-n-hexyl-4-n-propylphenyl group, a 2-cyclohexyl-4-n-propylphenyl group, a 2-n-butyl-4-isopropylphenyl group, a 2-isobutyl-4-isopropylphenyl group, a 2-tert-butyl-4-isopropylphenyl group, a 2-n-hexyl-4-isopropylphenyl group, a 2-cyclohexyl-4-isopropylphenyl group, a 2-isobutyl-4-n-butylphenyl group, a 2-tert-butyl-4-n-butylphenyl group, a 2-n-hexyl-4-n-butylphenyl group, a 2-cyclohexyl-4-n-butylphenyl group, a 2-tert-butyl-4-isobutylphenyl group, a 2-n-hexyl-4-isobutylphenyl group, a 2-cyclohexyl-4-isobutylphenyl group, a 2-n-hexyl-4-tert-butylphenyl group, a 2-cyclohexyl-4-tert-butylphenyl group, a 2-cyclohexyl-4-n-hexylphenyl group, a 2,5-dimethylphenyl group, a 2,5-diethylphenyl group, a 2,5-di-n-propylphenyl group, a 2,5-diisopropylphenyl group, a 2,5-di-n-butylphenyl group, a 2,5-diisobutylphenyl group, a 2,5-di-tert-butylphenyl group, a 2,5-di-n-hexylphenyl group, a 2,5-dicyclohexylphenyl group, a 2,4,6-trimethylphenyl group, a 2,4,6-triethylphenyl group, a 2,4,6-tri-n-propylphenyl group, a 2,4,6-triisopropylphenyl group, a 2,4,6-tri-n-butylphenyl group, a 2,4,6-triisobutylphenyl group, a 2,4,6-tri-tert-butylphenyl group, a 2,4,6-tri-n-hexylphenyl group, a 2,4,6-tricyclohexylphenyl group, a 2,6-diethyl-4-methylphenyl group, a 2,6-di-n-propyl-4-methylphenyl group, a 2,6-diisopropyl-4-methylphenyl group, a 2,6-di-n-butyl-4-methylphenyl group, a 2,6-diisobutyl-4-methylphenyl group, a 2,6-di-tert-butyl-4-methylphenyl group, a 2,6-di-n-hexyl-4-methylphenyl group, a 2,6-dicyclohexyl-4-methylphenyl group, a 2,4-dimethyl-6-(2-methylphenyl)phenyl group, a 2,4-dimethyl-6-(2-ethylphenyl)phenyl group, a 2,4-dimethyl-6-(2-n-propylphenyl)phenyl group, a 2,4-dimethyl-6-(2-isopropylphenyl) phenyl group, a 2,4-dimethyl-6-(2,6-dimethylphenyl)phenyl group, a 2,4-dimethyl-6-(2,6-diethylphenyl)phenyl group, a 2,4-dimethyl-6-(2,6-di-n-propylphenyl)phenyl group, a 2,4-dimethyl-6-(2,6-diisopropylphenyl)phenyl group, a 2,4-dimethyl-6-(2-methyl-6-ethylphenyl)phenyl group, a 2,4-dimethyl-6-(2-methyl-6-n-propylphenyl)phenyl group, a 2,4-dimethyl-6-(2-methyl-6-isopropylphenyl)phenyl group, a 2,4-dimethyl-6-(2-ethyl-6-n-propylphenyl)phenyl group, a 2,4-dimethyl-6-(2-ethyl-6-isopropylphenyl)phenyl group, and a 2,4-dimethyl-6-(1-naphthyl)phenyl group. Among them, preferred is an aryl group having 6 to 30 carbon atoms, and more preferred is an aryl group having 7 to 30 carbon atoms.

Examples of the silyl group of $R^{19}$ to $R^{25}$ in the formula (7) are mono-substituted silyl groups such as a methylsilyl group, an ethylsilyl group, and a phenylsilyl group; di-substituted silyl groups such as a dimethylsilyl group, a diethylsilyl group, and a diphenylsilyl group; and tri-substituted silyl groups such as a trimethylsilyl group, a trimethoxysilyl group, a dimethylmethoxysilyl group, a methyldimethoxysilyl group, a triethylsilyl group, a triethoxysilyl group, a tri-n-propylsilyl group, a triisopropylsilyl group, a tri-n-butylsilyl group, a tri-sec-butylsilyl group, a tert-butyldimethylsilyl group, a triisobutylsilyl group, a tert-butyldiphenylsilyl group, a cyclohexyldimethylsilyl group, a tricyclohexylsilyl group, and a triphenylsilyl group. Among them, preferred is a tri-substituted silyl group, and further preferred is a trimethylsilyl group, a triethylsilyl group, a triphenylsilyl group, a tert-butyldimethylsilyl group, a tert-butyldiphenylsilyl group, a cyclohexyldimethylsilyl group, or a triisopropylsilyl group.

Examples of the siloxy group of $R^{19}$ to $R^{25}$ in the formula (7) are a trimethylsiloxy group, a trimethoxysiloxy group, a dimethylmethoxysiloxy group, a methyldimethoxysiloxy group, a triethylsiloxy group, a triethoxysiloxy group, a tri-n-propylsiloxy group, a triisopropylsiloxy group, a tri-n-butylsiloxy group, a tri-sec-butylsiloxy group, a tert-butyldimethylsiloxy group, a triisobutylsiloxy group, a tert-butyldiphenylsiloxy group, a cyclohexyldimethylsiloxy group, a tricyclohexylsiloxy group, and a triphenylsiloxy group. Among them, preferred is a tri-substituted siloxy group, and further preferred is a trimethylsiloxy group, a triethylsiloxy group, a triphenylsiloxy group, a tert-butyldimethylsiloxy group, a tert-butyldiphenylsiloxy group, a cyclohexyldimethylsiloxy group, or a triisopropylsiloxy group.

Examples of the alkoxy group of $R^{19}$ to $R^{25}$ in the formula (7) are a methoxy group, an ethoxy group, a n-propoxy group, an isopropoxy group, a n-butoxy group, a sec-butoxy group, a tert-butoxy group, a n-pentyloxy group, a neopentyloxy group, a n-hexyloxy group, a n-octyloxy group, a n-dodecyloxy group, a n-pentadecyloxy group, and a n-eicosyloxy group. Among them, preferred is an alkoxy group having 1 to 20 carbon atoms, and more preferred is a methoxy group, an ethoxy group, an isopropoxy group, or a tert-butoxy group.

Examples of the aralkyloxy group of $R^{19}$ to $R^{25}$ in the formula (7) are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthylmethoxy group, and an anthracenylmethoxy group. Among them, preferred is an aralkyloxy group having 7 to 20 carbon atoms, and more preferred is a benzyloxy group.

Examples of the aryloxy group of $R^{19}$ to $R^{25}$ in the formula (7) are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a naphthoxy group, and an anthracenoxy group. Among them, preferred is an aryloxy group having 6 to 20 carbon atoms.

Examples of the substituted amino group of $R^{19}$ to $R^{25}$ in the formula (7) are linear alkyl amino groups such as an N-methylamino group, an N-ethylamino group, an N-n-butylamino group, an N,N-dimethylamino group, an N,N-diethylamino group, and an N,N-di-n-butylamino group; branched alkyl amino groups such as an N,N-diisopropylamino group, an N,N-diisobutylamino group, an N,N-di-tert-butylamino group, and an N,N-dineopentylamino group; and cyclic alkyl amino groups such as an N,N-dicyclohexylamino group and an N,N-dicyclooctylamino group.

Examples of the amide group of $R^{19}$ to $R^{25}$ in the formula (7) are an ethanamide group, an N-n-butylethanamide group, an N-methylethanamide group, an N-ethylethanamide group, an N-n-butylhexanamide group, an isopropanamide group, an isobutanamide group, a tert-butanamide group, a neopentanamide group, a cyclohexanamide group, and a cyclooctanamide group.

Examples of the imido group of $R^{19}$ to $R^{25}$ in the formula (7) are a succinimido group, a maleimido group, and a phthalimido group.

Examples of the hydrocarbylthio group of $R^{19}$ to $R^{25}$ in the formula (7) are alkylthio groups such as a methylthio group, an ethylthio group, an isopropylthio group, and a tert-butylthio group; arylthio groups such as a phenylthio group and a naphthylthio group; and aralkylthio groups such as a benzylthio group and a 9-fluorenylthio group.

The groups $R^{19}$ to $R^{25}$ in the formula (7) may have a substituent such as a halogen atom, an alkoxy group, an aryloxy group, an aralkyloxy group, a nitro group, an amino group, a substituted amino group, an amido group, an imido group, a silyl group, a siloxy group, a sulfonyl group, and a hydrocarbylthio group.

When any two or more of $R^{19}$ to $R^{25}$ in the formula (7) are linked with one another to form a ring, examples of the ring are aliphatic rings and aromatic rings. Those rings may have a substituent such as a halogen atom, an alkoxy group, an aryloxy group, an aralkyloxy group, a nitro group, an amino group, a substituted amino group, an amido group, an imido group, a silyl group, a siloxy group, a sulfonyl group, and a hydrocarbylthio group.

Examples of a divalent group forming the above aliphatic rings are a methylene group, an ethane-1,2-diyl group, a propane-1,3-diyl group, a propane-1,2-diyl group, a butane-1,2-diyl group, a butane-1,3-diyl group, a butane-1,4-diyl group, a pentane-1,2-diyl group, a pentane-1,3-diyl group, a pentane-1,4-diyl group, a pentane-1,5-diyl group, an ethylene-1,2-diyl group, a cyclohexane-1,2-diyl group, a cyclohexane-1,3-diyl group, a norbornane-2,3-diyl group, a norborn-2-ene-2,3-diyl group, a but-1-ene-1,2-diyl group, a but-1-ene-1,3-diyl group, a but-1-ene-2,3-diyl group, a but-2-ene-1,2-diyl group, a but-2-ene-1,3-diyl group, a but-2-ene-2,3-diyl group, a but-1,3-diene-1,2-diyl group, a but-1,3-diene-1,3-diyl group, a but-1,3-diene-1,4-diyl group, a 2,3-dimethyl-but-2-ene-2,3-diyl group, and a 2-pentene-2,4-diyl group.

Examples of a divalent group forming the above aromatic rings are a 1,2-phenylene group, a 3-methylbenzene-1,2-diyl group, a 4-methylbenzene-1,2-diyl group, a 3-ethylbenzene-1,2-diyl group, a 4-ethylbenzene-1,2-diyl group, a 3-n-propylbenzene-1,2-diyl group, a 4-n-propylbenzene-1,2-diyl group, a 3-n-butylbenzene-1,2-diyl group, a 4-n-butylbenzene-1,2-diyl group, a 3-isopropylbenzene-1,2-diyl group, a 4-isopropylbenzene-1,2-diyl group, a 3-isobutylbenzene-1,2-diyl group, a 4-isobutylbenzene-1,2-diyl group, a 3-tert-butylbenzene-1,2-diyl group, a 4-tert-butylbenzene-1,2-diyl group, a 1,3-phenylene group, a 2-methylbenzene-1,3-diyl group, a 4-methylbenzene-1,3-diyl group, a methylene-1,2-phenylene group, a biphenyl-2,2'-diyl group, a biphenyl-2,3'-diyl group, and an acenaphthene-1,2-diyl group.

The organoaluminum compound in the present invention may be known in the art. Examples thereof are the following compounds (A1) to (A3), and a combination of two or more thereof:

(A1) an organoaluminum compound represented by the formula, $E^1_d AlX^2_{3-d}$;

(A2) a cyclic alumoxane represented by the formula, $\{-Al(E^2)-O-\}_e$; and (A3) a linear alumoxane represented by the formula, $E^3\{-Al(E^3)-O-\}_f AlE^3_2$, wherein $E^1$, $E^2$ and $E^3$ are independently of one another a hydrocarbyl group, and when plural $E^1$s, $E^2$s or $E^3$s exist, they are the same as, or different from one another; $X^2$ is a hydrogen atom or a halogen atom, and when plural $X^2$s exist, they are the same as, or different from each other; d is a number satisfying $0<d\leq3$; e is an integer of 2 or more, and preferably an integer of 2 to 40; and f is an integer of 1 or more, and preferably an integer of 1 to 40.

The hydrocarbyl group of $E^1$, $E^2$ and $E^3$ is preferably a hydrocarbyl group having 1 to 8 carbon atoms, and more preferably an alkyl group having 1 to 8 carbon atoms. Examples of the alkyl group of $E^1$, $E^2$ and $E^3$ are a methyl group, an ethyl group, a n-propyl group, an isopropyl group, a n-butyl group, an isobutyl group, a n-pentyl group, and a neopentyl group. Among them, preferred is a methyl group or an isobutyl group.

Examples of the above organoaluminum compound (A1) are such as trimethylaluminum, triethylaluminum, tripropylaluminum, triisobutylaluminum, and trihexylaluminum; dialkylaluminum chlorides such as dimethylaluminum chloride, diethylaluminum chloride, dipropylaluminum chloride, diisobutylaluminum chloride and dihexylaluminum chloride;

alkylaluminum dichlorides such as methylaluminum dichloride, ethylaluminum dichloride, propylaluminum dichloride, isobutylaluminum dichloride and hexylaluminum dichloride; and dialkylaluminum hydrides such as dimethylaluminum hydride, diethylaluminum hydride, dipropylaluminum hydride, diisobutylaluminum hydride and dihexylaluminum hydride. Among them, preferred is a trialkylaluminum, and more preferred is triethylaluminum or triisobutylaluminum.

The above cyclic alumoxane (A2) and linear alumoxane (A3) can be produced according to various processes. Those processes are not particularly limited, and may be those known in the art. Examples of the process are (i) a process comprising the step of contacting water with a solution of a trialkylaluminum such as trimethylaluminum in a suitable organic solvent such as benzene and an aliphatic hydrocarbon, and (ii) a process comprising the step of contacting a trialkylaluminum such as trimethylaluminum with a crystal water-containing metal salt such as copper sulfate hydrate.

The boron compound in the present invention may be known in the art. Examples thereof are the following compounds (B1) to (B3), and a combination of two or more thereof:

(B1) a boron compound represented by the formula, $BQ^1Q^2Q^3$;

(B2) a boron compound represented by the formula, $G^+(BQ^1Q^2Q^3Q^4)^-$; and (B3) a boron compound represented by the formula, $(J-H)^+(BQ^1Q^2Q^3Q^4)^-$;

wherein B is a trivalent boron atom; $Q^1$, $Q^2$, $Q^3$ and $Q^4$ are independently of one another a halogen atom, a hydrocarbyl group, a halogenated hydrocarbyl group, a silyl group, a siloxy group, an alkoxy group, an amino group, a substituted amino group, an amido group, or an imido group; $G^+$ is an inorganic or organic cation; J is a neutral Lewis base; and $(J-H)^+$ is a Broensted acid.

$Q^1$ to $Q^4$ in the above formulas are preferably a halogen atom, a hydrocarbyl group having 1 to 20 carbon atoms, a halogenated hydrocarbyl group having 1 to 20 carbon atoms, a silyl group having 1 to 20 carbon atoms, a siloxy group having 1 to 20 carbon atoms, a $C_{2-20}$ hydrocarbyl group-carrying amino group, a $C_{2-20}$ hydrocarbyl group-carrying amido group, or a $C_{2-20}$ hydrocarbyl group-carrying imido group; more preferably a halogen atom, a hydrocarbyl group having 1 to 20 carbon atoms, or a halogenated hydrocarbyl group having 1 to 20 carbon atoms; further preferably a fluorinated $C_{1-20}$ hydrocarbyl group containing one or more fluorine atoms; and particularly preferably a fluorinated $C_{6-20}$ aryl group containing one or more fluorine atoms.

Examples of the above boron compound (B1) are tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, and phenylbis(pentafluorophenyl)borane. Among them, most preferred is tris(pentafluorophenyl)borane.

Examples of the inorganic cation of $G^+$ in the above boron compound (B2) are a ferrocenium cation, an alkyl group-having ferrocenium cation, and a silver cation. An example of the organic cation of $G^+$ therein is a triphenylmethyl cation. Among them, $G^+$ is preferably a carbenium cation, and particularly preferably a triphenylmethyl cation.

Examples of $(BQ^1Q^2Q^3Q^4)^-$ in the above boron compound (B2) are tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, and tetrakis(3,5-bistrifluoromethylphenyl)borate.

Examples of the above boron compound (B2) are lithium tetrakis(3,5-bistrifluoromethylphenyl)borate, sodium tetrakis(3,5-bistrifluoromethylphenyl)borate, potassium tetrakis(3,5-bistrifluoromethylphenyl)borate, silver tetrakis(pentafluorophenyl)borate, ferrocenium tetrakis(pentafluorophenyl)borate, 1,1'-dimethylferrocenium tetrakis(pentafluorophenyl)borate, tetrabutylphosphonium tetrakis(pentafluorophenyl)borate, tetraphenylphosphonium tetrakis(pentafluorophenyl)borate, tetramethylammonium tetrakis(pentafluorophenyl)borate, trimethylsulphonium tetrakis(pentafluorophenyl)borate, diphenyliodonium tetrakis(pentafluorophenyl)borate, triphenylcarbenium tetrakis(pentafluorophenyl)borate, and triphenylcarbenium tetrakis(3,5-bistrifluoromethylphenyl)borate. Among them, most preferred is triphenylcarbenium tetrakis(pentafluorophenyl)borate.

Examples of $(J-H)^+$ in the above boron compound (B3) are a trialkylammonium, an N,N-dialkylanilinium, a dialkylammonium, and a triarylphosphonium. Examples of the $(BQ^1Q^2Q^3Q^4)^-$ therein are the same as those mentioned above.

Examples of the above boron compound (B3) are triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-dimethyl-2,4,6-trimethylanilinium tetrakis(pentafluorophenyl)borate, N,N-dimethylanilinium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate, and tri(dimethylphenyl)phosphonium tetrakis(pentafluorophenyl)borate. Among them, most preferred is tri(n-butyl)ammonium tetrakis(pentafluorophenyl)borate, or N,N-dimethylanilinium tetrakis(pentafluorophenyl)borate.

The boron compound is preferably the above boron compound (B2) or (B3), and particularly preferably triphenylcarbenium tetrakis(pentafluorophenyl)borate, tri(n-butyl)ammonium tetrakis(pentafluorophenyl)borate, or N,N-dimethylanilinium tetrakis(pentafluorophenyl)borate.

In the present invention, there is not a particular limitation in a method for contacting the nickel compound with the organoaluminum compound and/or boron compound. Examples of the method are (i) a method comprising the step of merely blending those compounds, and (ii) a method comprising the step of mixing those compounds under an agitation, wherein the compound represented by the formula (3) (monomer) may be present at the same time.

When forming a polymerization catalyst by contacting the nickel compound with the organoaluminum compound, the organoaluminum compound is preferably the above cyclic alumoxane (A2), linear alumoxane (A3), or a combination thereof, from a viewpoint of forming a highly active polymerization catalyst. When forming a polymerization catalyst by contacting the nickel compound with the organoaluminum compound and the boron compound, the organoaluminum compound is preferably the above organoaluminum compound (A1), from the same viewpoint as mentioned above.

The organoaluminum compound is not limited in its amount used, as long as a polymerization catalyst can be formed, and is used in amount of generally 0.1 to 10,000 parts by mol, and preferably 5 to 2,000 parts by mol, per one part by mol of the nickel compound. The amount of 0.1 part by mol or larger can form a polymerization catalyst having a sufficient polymerization activity. The amount of 10,000 parts by mol or smaller can prevent a polymer produced from chain-transferring to the organoaluminum compound, which results in production of a polymer having a higher molecular weight, and also can form a polymerization catalyst having a higher polymerization activity. The boron compound is used in amount of generally 0.01 to 100 parts by mol, and preferably 0.5 to 10 parts by mol, per one part by mol of the nickel compound. The amount of 0.01 part by mol or larger can form a polymerization catalyst having a sufficient polymerization activity. The amount of 100 parts by mol or smaller can reduce a production cost of a polymerization catalyst.

Each of the nickel compound, the organoaluminum compound, and the boron compound may be used in a state of a solution thereof. Examples of a solvent for the solution are methylene chloride, chloroform, toluene, pentane, hexane, and heptane. Among them, preferred is methylene chloride, chloroform or toluene.

A solution of the nickel compound has a concentration of generally 0.01 to 500 µmol/L, preferably 0.05 to 100 µmol/L, and more preferably 0.05 to 50 µmol/L. A solution of the organoaluminum compound has a concentration of generally 0.01 to 10,000 µmol/L, preferably 0.1 to 5,000 µmol/L, and more preferably 0.1 to 2,000, in terms of the amount of aluminum atoms contained in the solution. A solution of the boron compound has a concentration of generally 0.01 to 500 µmol/L, preferably 0.05 to 200 µmol/L, and more preferably 0.05 to 100 µmol/L. The amount of a solvent used can be reduced by (i) keeping a solution of the nickel compound in its concentration of 0.01 µmol/L or higher, (ii) keeping a solution of the organoaluminum compound in its concentration of 0.01 µmol/L or higher, in terms of the amount of aluminum atoms contained in the solution, and (iii) keeping a solution of the boron compound in its concentration of 0.01 µmol/L or higher, which results in reducing a production cost of a polymerization catalyst.

The nickel compound, the organoaluminum compound, and the boron compound can dissolve thoroughly in a solvent by (i) keeping a solution of the nickel compound in its concentration of 500 µmol/L or lower, (ii) keeping a solution of the organoaluminum compound in its concentration of 10,000 µmol/L or lower, in terms of the amount of aluminum atoms contained in the solution, and (iii) keeping a solution of the boron compound in its concentration of 500 µmol/L or lower, which can prevent those compounds from precipitating.

The above polymerization catalyst may be combined with a carrier or a support comprising particles of an inorganic or organic compound. The carrier or the support may be known in the art. Examples of the inorganic compound are silica gel and alumina, and an example of the organic compound is a styrene polymer.

A polymerization method in the present invention is not particularly limited. Examples of the polymerization method are a gas-phase polymerization method, a bulk polymerization method, and a solution or suspension polymerization method using a suitable polymerization solvent, those methods being batch-wise or continuous. The polymerization solvent is a solvent non-deactivating a polymerization catalyst. Examples of the solvent are hydrocarbon solvents such as benzene, toluene, pentane, hexane, heptane, and cyclohexane, and a halogenated solvent such as dichloromethane and chloroform.

A polymerization temperature in the present invention is not particularly limited, and is generally −100 to 250° C., and preferably −50 to 200° C. The polymerization temperature of −100° C. or higher can make a polymerization catalyst sufficiently active. The polymerization temperature of 250° C. or lower can produce a polymer having a higher molecular weight, and also can prevent a side reaction such as an isomerization reaction.

A polymerization time in the present invention is not particularly limited, and is generally one minute to 72 hours. The polymerization time of one minute or longer can produce a polymer in a sufficiently high yield, and the polymerization time of 72 hours or shorter can reduce a production cost of a polymer.

The process for producing a polymer of the present invention may use a chain transfer agent such as hydrogen, in order to regulate a molecular weight of a polymer produced.

The polymer of the present invention can be preferably applied to various uses such as automobile parts, parts for electric home appliance, and optical materials, through the utilization of its superior heat resistance.

EXAMPLE

The present invention is explained with reference to the following Examples, which do not limit the scope of the present invention.

Reference Example 1

Preparation of 9,9-diallylfluorene

There were charged 10 g of fluorene manufactured by Wako Pure Chemical Industries, Ltd. and 10.1 g of potassium tert-butoxide manufactured by Sigma Aldrich Japan Co., Ltd. into a 200 mL round bottom flask, and then 120 mL of dehydrated N,N-dimethylformamide manufactured by Wako Pure Chemical Industries, Ltd. was added to the round bottom flask. While stirring the round bottom flask at 50° C. in an atmosphere of nitrogen, 5.86 mL of allyl chloride manufactured by Kanto Chemical Co., Inc. was added dropwise to the round bottom flask over 2 hours. The round bottom flask was stirred further for 8 hours at 50° C., and then 10.1 g of potassium tert-butoxide manufactured by Sigma Aldrich Japan Co., Ltd. was additionally added to the round bottom flask, and 5.86 mL of allyl chloride manufactured by Kanto Chemical Co., Inc. was additionally added dropwise to the round bottom flask over 2 hours. The round bottom flask was stirred at 50° C. overnight, thereby obtaining a reaction product. The reaction product was added to 900 mL of water to obtain a mixture, and then 300 mL of hexane was added to the mixture, thereby obtaining a mixture containing an organic phase a water phase. The organic phase was extracted with ether three times. The extract was washed with water four times. The washed extract was further washed with dilute hydrochloric acid and with water in this order. The washed extract (ether solution) was dried over anhydrous magnesium sulfate manufactured by Nacalai Tesque, Inc. The dried ether solution was subjected to solvent elimination by evaporation, and the remainder was distilled under a reduced pressure, thereby obtaining 12.8 g (yield: 86.4%) of 9,9-diallylfluorene as yellow oil at 90° C./4 mmHg.

Example 1

There were charged 7.2 mg of dibromo[N,N'-(1,2-dihydroacenaphthylene-1,2-diylidene)bis(2,6-diisopropyl aniline-κN)]nickel (nickel compound: prepared according to Recueil des Travaux Chimiques de Pays-Bas, Vol. 113, page 88 (1994)), 0.59 mL of toluene, and 0.246 g of 9,9-diallylfluorene prepared in Reference Example 1, into a dried 25 mL Schlenk flask. The resultant mixture was stirred at 0° C. for one minute. To the mixture, 1.41 mL of a toluene solution of an organoaluminum compound was added, the toluene solution having a trade name of MMAO-3A manufactured by TOSOH FINECHEM CORPORATION, and containing 6.6% by weight of an aluminum atom, provided that the total amount of the toluene solution is 100% by weight. The obtained mixture was stirred for three hours, thereby obtaining a reaction mixture. The reaction mixture was poured into about 50 mL of methanol to precipitate a solid polymer. The solid polymer was filtered off, and the polymer was washed with methanol, and then was vacuum dried, thereby obtaining 0.1247 g of a polymer (yield: 50.7%) as a white powder. The polymer was found to be a homopolymer of 9,9-diallylfluorene, containing only the unit represented by the formula (2). The polymer had a number-average molecular weight (Mn) of 6,100; a molecular weight distribution (Mw/Mn) of 1.36; a solid state at a room temperature; no glass-transition point (Tg) in a measurement range (−60° C. to 300° C.); and a 5%-decomposition temperature ($T_d^5$) of 383° C. (TG analysis). Those Tg and $T_d^5$ mean that the polymer of the present invention is very superior in its heat resistance property.

The above glass-transition point was measured according to a differential scanning calorimetry (DSC) using an equipment, DSC-6200, manufactured by Seiko Instruments & Electronics Ltd. under the following conditions:

heating from 25° C. to 300° C. at a rate of 10° C./minute, and keeping at 300° C. for 5 minutes; then, cooling from 300° C. to −60° C. at a rate of 20° C./minute, and keeping at −60° C. for 5 minutes; and then, measuring under heating from −60° C. to 300° C. at a rate of 10° C./minute.

The above number-average molecular weight (Mn) and molecular weight distribution (Mw/Mn) were measured according to a gel permeation chromatography (GPC) under the following conditions using a GPC equipment, HLC-8020, manufactured by Tosoh Corporation, with a calibration curve prepared using standard polystyrenes:

one column, SUPER HM-LX, manufactured by Tosoh Corporation;

measurement temperature of 40° C.;

solvent of tetrahydrofuran; and sample concentration of 1 mg-sample/mL-solution.

Existence of the unit represented by the formula (2) in the polymer was confirmed by assigning signals in the range of 15 to 60 ppm of a $^{13}$C-NMR spectrum to a linear hydrocarbyl structure and a cyclic hydrocarbyl structure contained in the unit represented by the formula (2), the $^{13}$C-NMR spectrum being measured using a $^{13}$C-NMR equipment, LA-500, manufactured by JEOL LTD, under the following conditions;

measurement solvent of chloroform-$d_1$;

measurement temperature of room temperature;

sample concentration of 50 mg-sample/0.5 mL-solution; and reference material of chloroform-$d_1$ (77 ppm).

Comparative Example 1

There were charged 6.60 mg of chloro(methyl)[N,N'-(1,2-dihydroacenaphthylene-1,2-diylidene)bis(2,6-diisopropylaniline-κN)]palladium (prepared according to Recueil des Travaux Chimiques de Pays-Bas, Vol. 113, page 88 (1994)), and 10.6 mg of sodium tetrakis{3,5-bis(trifluoromethyl)phenyl}borate (boron compound: prepared according to Organometallics, Vol. 11, page 3920 (1992)) into a 25 mL Schlenk tube. To the resultant mixture, 0.5 mL of dehydrated methylene chloride manufactured by Kanto Chemical Co., Inc. was added, and the mixture was stirred for 30 minutes. Then, 0.172 g of 9,9-diallylfluorene was added to the mixture, and the obtained mixture was stirred at a room temperature for 5 minutes to polymerize 9,9-diallylfluorene, thereby obtaining 0.093 g of a polymer.

The polymer was soluble in chloroform, and had a glass-transition point (Tg) of 154° C.; a 5%-decomposition temperature ($T_d^5$) of 274° C. (TG analysis); a number-average molecular weight (Mn) of 17,800; and a molecular weight distribution (Mw/Mn) of 2.0. All units contained in the polymer had the structure represented by the formula (1).

The above glass-transition point (Tg) was measured according to a differential scanning calorimetry (DSC) using an equipment, SSC-5200, manufactured by Seiko Instruments & Electronics Ltd. under the following conditions:

heating from 25° C. to 200° C. at a rate of 10° C./minute, and keeping at 135° C. for 5 minutes; then, cooling from 200° C. to −60° C. at a rate of 20° C./minute, and keeping at −60° C. for 5 minutes; and then, measuring under heating from −60° C. to 200° C. at a rate of 10° C./minute.

The above number-average molecular weight (Mn) and molecular weight distribution (Mw/Mn) were measured according to a gel permeation chromatography (GPC) under the following conditions using an equipment manufactured by JASCO Corporation having a degasser (DG-980-50), a pump (PU-980), an auto-sampler (AS-950), a column oven (CO-966), an RI detector (RI-930) and a UV detector (UV-975), with a calibration curve prepared using standard polystyrenes:

two columns, SHODEX-806L, manufactured by Showa Denko K.K.;

measurement temperature of 40° C.;

solvent of chloroform; and sample concentration of 1 mg-sample/mL-solution.

The above structure of all the units contained in the polymer was measured according to a $^{13}$CNMR method with a $^{13}$C-NMR equipment, LA-500, manufactured by JEOL LTD, under the following conditions;

measurement solvent of chloroform-$d_1$;

measurement temperature of room temperature;

sample concentration of 50 mg-sample/0.5 mL-solution; and reference material of chloroform-$d_1$ (77 ppm).

We claim:

1. A process for producing a polymer containing a unit represented by the following formula (1), comprising the step of polymerizing a diene compound represented by the following formula (3) in the presence of a polymerization catalyst formed by contacting a nickel compound with an organoaluminum compound and/or a boron compound:

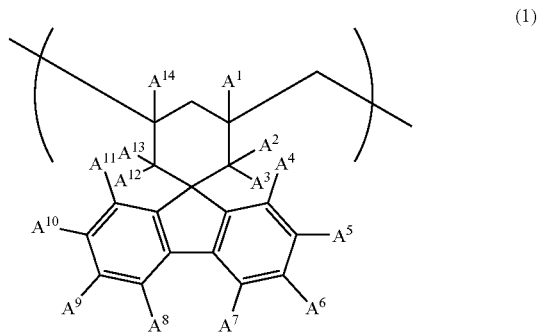

(1)

(3)

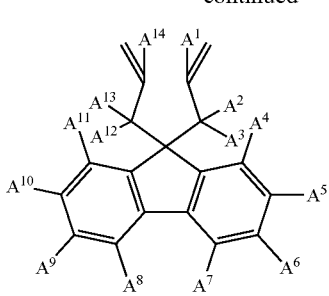

wherein $A^1$ to $A^{14}$ are independently of one another a hydrogen atom, a halogen atom or a hydrocarbyl group having 1 to 6 carbon atoms.

2. The process for producing a polymer according to claim 1, wherein the nickel compound is a compound represented by the following formula (4):

(4)

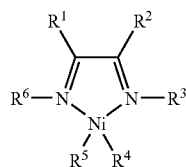

wherein $R^1$ and $R^2$ are independently of each other a hydrogen atom or a hydrocarbyl group having 1 to 20 carbon atoms, and $R^1$ and $R^2$ may be linked with each other to form a ring; $R^3$ and $R^6$ are independently of each other a hydrocarbyl group having 1 to 30 carbon atoms; and $R^4$ and $R^5$ are independently of each other a hydrogen atom, a halogen atom, an alkyl group, an aralkyl group, an aryl group, a silyl group, a siloxy group, an alkoxy group, an aralkyloxy group, or an aryloxy group, and may be linked with each other to form a ring.

3. The process for producing a polymer according to claim 1, wherein the nickel compound is a compound represented by the following formula (5):

(5)

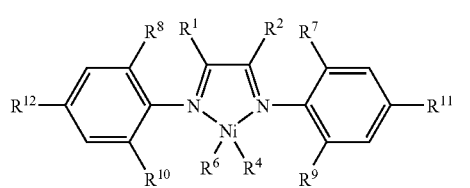

wherein $R^1$ and $R^2$ are independently of each other a hydrogen atom or a hydrocarbyl group having 1 to 20 carbon atoms, and $R^1$ and $R^2$ may be linked with each other to form a ring; $R^4$ and $R^5$ are independently of each other a hydrogen atom, a halogen atom, an alkyl group, an aralkyl group, an aryl group, a silyl group, a siloxy group, an alkoxy group, an aralkyloxy group, or an aryloxy group, and may be linked with each other to form a ring; $R^7$ and $R^8$ are independently of each other a hydrogen atom, a halogen atom, an alkyl group, an aralkyl group, a silyl group, a siloxy group, an alkoxy group, an aralkyloxy group, an amino group, a substituted amino group, an amide group, an imido group, or a hydrocarbylthio group; $R^9$ and $R^{10}$ are independently of each other an aryl group having 7 to 20 carbon atoms; and $R^{11}$ and $R^{12}$ are independently of each other a hydrogen atom, a halogen atom, an alkyl group, an aralkyl group, an aryl group, a silyl group, a siloxy group, an alkoxy group, an aralkyloxy group, an aryloxy group, an amino group, a substituted amino group, an amide group, an imido group, or a hydrocarbylthio group.

4. The process for producing a polymer according to claim 1, wherein the nickel compound is a compound represented by the following formula (6):

(6)

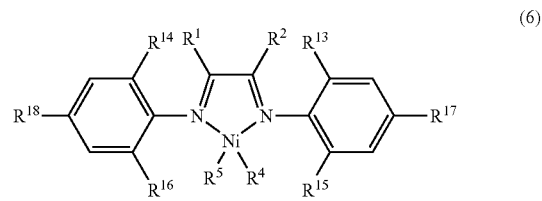

wherein $R^1$ and $R^2$ are independently of each other a hydrogen atom or a hydrocarbyl group having 1 to 20 carbon atoms, and $R^1$ and $R^2$ may be linked with each other to form a ring; $R^4$ and $R^5$ are independently of each other a hydrogen atom, a halogen atom, an alkyl group, an aralkyl group, an aryl group, a silyl group, a siloxy group, an alkoxy group, an aralkyloxy group, or an aryloxy group, and may be linked with each other to form a ring; $R^{13}$, $R^{14}$, $R^{15}$ and $R^{16}$ are independently of one another a hydrogen atom, a halogen atom, an alkyl group, an aralkyl group, an aryl group having 6 to 30 carbon atoms, a silyl group, a siloxy group, an alkoxy group, an aralkyloxy group, an aryloxy group, an amino group, an amide group, an imido group, or a hydrocarbylthio group; and $R^{17}$ and $R^{18}$ are independently of each other a hydrogen atom, a halogen atom, an alkyl group, an aralkyl group, an aryl group, a silyl group, a siloxy group, an alkoxy group, an aralkyloxy group, an aryloxy group, an amino group, an amide group, an imido group, or a hydrocarbylthio group.

5. The process for producing a polymer according to claim 1, wherein the nickel compound is a compound represented by the following formula (7):

(7)

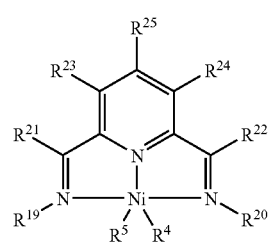

wherein $R^4$ and $R^5$ are independently of each other a hydrogen atom, a halogen atom, an alkyl group, an aralkyl group, an aryl group, a silyl group, a siloxy group, an alkoxy group, an aralkyloxy group, or an aryloxy group, and may be linked with each other to form a ring; and $R^{19}$ to $R^{25}$ are independently of one another a hydrogen atom, a halogen atom, an alkyl group, an aralkyl group, an aryl group, a silyl group, a siloxy group, an alkoxy group, an aralkyloxy group, an aryloxy group, an amino group, a substituted amino group, an amide group, an imido group, or a hydrocarbylthio group, and any two or more of $R^{19}$ to $R^{25}$ may be linked with one another to form a ring.

* * * * *